United States Patent
Iagnemma et al.

(10) Patent No.: US 10,740,863 B2
(45) Date of Patent: Aug. 11, 2020

(54) LOCATION SIGNALING WITH RESPECT TO AN AUTONOMOUS VEHICLE AND A RIDER

(71) Applicant: nuTonomy Inc., Cambridge, MA (US)

(72) Inventors: Karl Iagnemma, Belmont, MA (US); Harshavardhan Ravichandran, Singapore (SG)

(73) Assignee: nuTonomy Inc., Boston, MA (US)

( * ) Notice: Subject to any disclaimer, the term of this patent is extended or adjusted under 35 U.S.C. 154(b) by 196 days.

(21) Appl. No.: 15/401,499

(22) Filed: Jan. 9, 2017

(65) Prior Publication Data
US 2018/0196416 A1    Jul. 12, 2018

(51) Int. Cl.
*G06Q 50/30* (2012.01)
*G05D 1/00* (2006.01)

(52) U.S. Cl.
CPC .......... *G06Q 50/30* (2013.01); *G05D 1/0027* (2013.01); *G05D 2201/0213* (2013.01)

(58) Field of Classification Search
CPC .. G05D 1/0088; G05D 1/0212; G05D 1/0297; G05D 1/0214; G05D 1/0248; G05D 1/0255
See application file for complete search history.

(56) References Cited

U.S. PATENT DOCUMENTS

| 9,412,280 B1 | 8/2016 | Zwillinger et al. |
| 9,547,307 B1 | 1/2017 | Cullinane |
| 2015/0285644 A1 | 10/2015 | Pfaff et al. |
| 2015/0285645 A1 | 10/2015 | Maise et al. |
| 2016/0161266 A1 | 6/2016 | Crawford et al. |
| 2016/0231122 A1 | 8/2016 | Beaurepaire |
| 2016/0334229 A1 | 11/2016 | Ross et al. |
| 2017/0123429 A1 | 5/2017 | Levinson et al. |
| 2018/0196415 A1 | 7/2018 | Iagnemma et al. |
| 2018/0196417 A1 | 7/2018 | Iagnemma |
| 2018/0249509 A1* | 8/2018 | Yi .................... H04W 74/0833 |
| 2018/0249511 A1* | 8/2018 | Rathonyi .......... H04W 74/0841 |

(Continued)

FOREIGN PATENT DOCUMENTS

| JP | 2015191264 | 11/2015 |
| WO | WO 2015169204 | 11/2015 |
| WO | WO 2017155740 | 9/2017 |

OTHER PUBLICATIONS

Spieser et al, "Toward a systematic approach to the design and evaluation of automated mobility-on-demand systems: A case study in Singapore," Road Vehicle Automation, 2014, 229-245.

(Continued)

*Primary Examiner* — Redhwan K Mawari
(74) *Attorney, Agent, or Firm* — Fish & Richardson P.C.

(57) ABSTRACT

Among other things, a signal is emitted from a signaling device and is captured by stimulus detectors location on a vehicle, including an autonomous vehicle. Properties of the signal are analyzed, potentially in concert with other information, to determine the precise location of the signaling device and therefore the precise goal location for picking up a rider of the autonomous vehicle. In response to the calculation of the precise goal location, the autonomous vehicle attempts to travel to a location as near as possible to the precise goal location to facilitate entry of the rider into the vehicle.

11 Claims, 20 Drawing Sheets

(56) References Cited

U.S. PATENT DOCUMENTS

2018/0249521 A1\* 8/2018 Kim ............... H04W 76/14
2018/0249528 A1\* 8/2018 Kuge .............. H04W 76/27
2018/0249532 A1\* 8/2018 Lee ................ H04W 4/70
2018/0249564 A1\* 8/2018 Aggarwal ........ H05B 37/0272

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

\* cited by examiner

SOFTWARE PROCESSOR, 3400
    SIGNAL DECODING PROCESS, 3402
        GEOMETRIC ELEMENTS, 3404
        BLACK AND WHITE, GREYSCALE, COLOUR, 3406
        TEXTURE, 3408
        FACIAL RECOGNITION, 3410
        GESTURE RECOGNITION, 3412
        LIGHT MODULATION, 3414
        SOUND MODULATION, 3416

SIGNAL BROADCASTING PROCESS, 3420
        IMAGE BASED SIGNAL, 3422
        LIGHT BASED SIGNAL, 3424
        SOUND BASED SIGNAL, 3426

LOCATION DETERMINATION PROCESS, 3440
        BEARING DETERMINATION, 3442
        DISTANCE DETERMINATION, 3444
        SCALE ANALYSIS PROCESS, 3430

FIG. 3

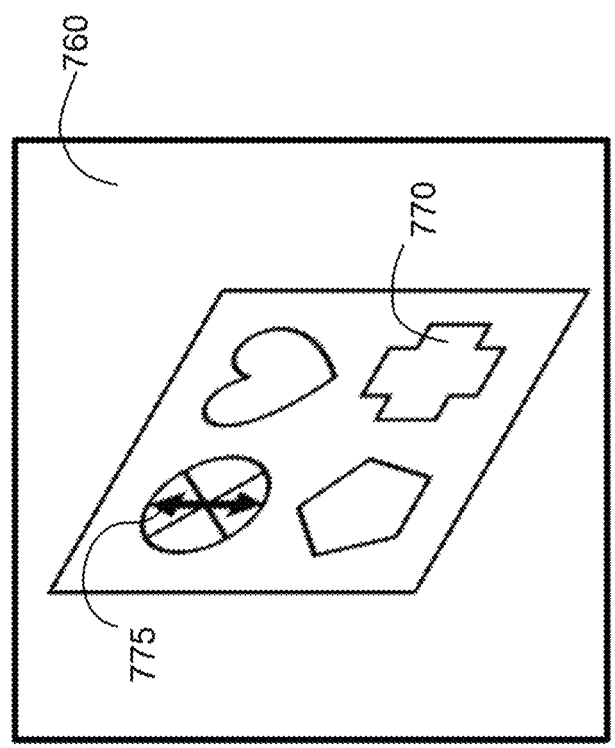
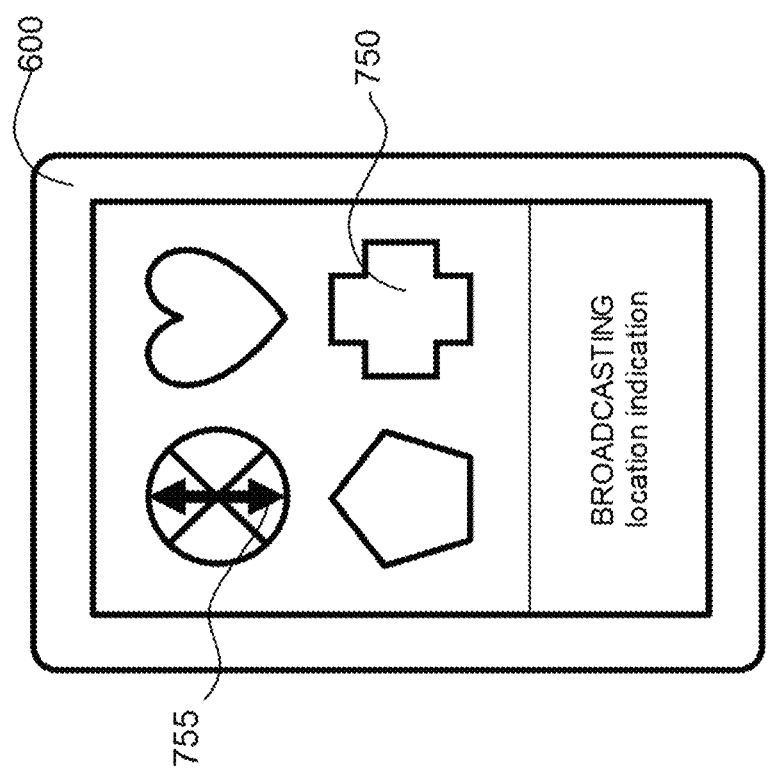
FIG. 22

LOCATION SIGNALING WITH RESPECT TO AN AUTONOMOUS VEHICLE AND A RIDER

BACKGROUND

This description relates to location signaling with respect to an autonomous vehicle (sometimes abbreviated as an AV) and a rider.

As shown in FIG. 1, in a common method for a rider of a taxicab or a ride-sharing vehicle to hail and then enter the vehicle, the rider posts 10 a ride request by interacting with a mobile app. The ride request includes information about a general goal location for the pick-up desired by the rider, which is often specified imprecisely or inaccurately. The ride request is processed by the mobile app and then forwarded 12 through the cellular telephone network or Internet to a central server where it is further processed (including potentially geocoding the pick-up location into coordinates and assigning a vehicle) and then forwarded 14 through the cellular telephone network or Internet to the driver of the assigned vehicle. The driver of the assigned vehicle travels 16 to the rider's desired general goal location, then often communicates by phone or text or both with the rider 18 to learn or agree upon a precise goal location for the pick-up activity, which is a location that is often defined precisely and accurately. The driver of the vehicle then travels 20 to the rider's precise goal location and the rider is authenticated and enters the vehicle 22 which then proceeds to a destination 24.

SUMMARY

In general, in an aspect, when an autonomous vehicle is in the vicinity of a general goal location for a goal location activity, the autonomous vehicle or a user or both of them engages in location signaling activities. Based on information determinable from the location signaling activities, the autonomous vehicle or the user or both move to a stopping place that is determined to be feasible and acceptable and at which the goal location activity can occur. In some implementations, a precise goal location is determined. The stopping place is in the vicinity of the precise goal location.

In general, in an aspect, when an autonomous vehicle is in the vicinity of a general goal location for a goal location activity, the autonomous vehicle or a user or both of them engage in location signaling activities. Based on information determinable from the location signaling activities, a process determines a precise goal location.

Implementations may include one or a combination of two or more of the following features. The process determines a stopping place in the vicinity of the precise goal location. An AV system associated with the autonomous vehicle determines the precise goal location. The location signaling activities include the user or a signaling device associated with the user sending explicit precise goal location information. The precise goal location is inferred from the signaling activities without the signaling activities conveying explicit location information The signaling activities include the user or a signaling device associated with the user sending explicit precise goal location information. Signaling activities include the autonomous vehicle sending acknowledgment information with respect to the precise goal location. The signaling activities include the autonomous vehicle sending information about its location. The location signaling activities include line of sight signaling. The location signaling activities include sending messages through a central server. The precise goal location is in the vicinity of the general goal location. The signaling activities convey information about a precise goal location in the vicinity of the general goal location. The user hails the moving autonomous vehicle when it is in the vicinity of the user. The location signaling activities engaged in by the user include controlling an application running on a mobile device. The location signaling activities engaged in by the user include manually effected non-electronic signaling activities. The location signaling activities involve a location indication signal. The autonomous vehicle moves to or occupies a target stopping place close to the precise goal location. The precise goal location is the actual precise location of the user. An identification of the general goal location is received from the user. The identification of the general goal location is received from a process. The identification of the general goal location is received from an external source at the autonomous vehicle. A process determines a precise goal location based on the location signaling activities. The precise goal location is determined based on a location indication signal sent by the user or a device of the user. The precise goal location is determined based on information received other than by the location signaling activities. The location signaling activities include a location response signal sent by or on behalf of the autonomous vehicle. The location signaling activities include signals indicating progress of the autonomous vehicle toward the precise goal location. The location signaling activities include signaling modes that include one or a combination of two or more of wireless signaling or non-wireless signaling. The wireless signaling modes include electronic signaling or non-electronic signaling. The non-electronic signaling includes one or a combination of two or more of displaying an image or sequence of images, emitting a sequence of light signals, emitting a sequence of sound signals, emitting a wireless communication signal, or engaging in gestures or facial expressions. The electronic signaling includes signaling from one or a combination of two or more of a smartphone, a tablet, a smart watch, smart glasses, or other smart wearable device. The non-electronic signaling includes one or a combination of two or more of a hand, or facial, or other gesture, or whistling, yelling, or making another sound. non-electronic signaling involves identifiable passive features of the user. The location signaling activities conform to a commonly accepted protocol. The process bases the determination of the precise goal location on a known signaling mode having been used at least in part for the location signaling activities. The process determines a bearing from the autonomous vehicle. The bearing is determined repeatedly. The process determines a distance from the autonomous vehicle. The distance is determined repeatedly. The process uses road data. The location signaling activities include a signaling device associated with the user sending its precise location. The precise location is sent through a communication network. The precise location is determined by the signaling device associated with the user. The location signaling activities include the autonomous vehicle sending by line-of-sight a location indication signal identifying the location of the autonomous vehicle. The location signaling activities include the autonomous vehicle sending a signal identifying a precise goal location determined by the autonomous vehicle and in the vicinity of the general goal location. The precise goal location changes over time. Another vehicle receives signals that are part of the location signaling activities and communicates with the autonomous vehicle or a user device based on the signals. A detector in an infrastructure element receives signals that are part of the signaling activities and communicates with the autonomous vehicle or a user device based on the signals.

In general, in an aspect, a user of an autonomous vehicle that is proceeding toward a general goal location signaling to the autonomous vehicle information from which a precise goal location in the vicinity of the general goal location can be determined. In some implementations, a target stopping place is determined from the information.

In general, in an aspect, an autonomous vehicle that is proceeding toward a general goal location signals to a user of the autonomous vehicle information from which a precise goal location in the vicinity of a general goal location can be determined. In some implementations, a target stopping place is determined from the information.

In general, in an aspect, when an autonomous vehicle is in the vicinity of a general goal location for a goal location activity, the autonomous vehicle or a user or both of them engages in location signaling activities. Information determinable from the location signaling activities is presented at a remote device to a remotely located teleoperator. Information specified by the remotely located teleoperator is received from the remote device identifying a precise goal location in the vicinity of the general goal location.

In general, in an aspect, the autonomous vehicle system determines a precise goal location in the vicinity of a general goal location to which an autonomous vehicle is proceeding, a stopping place at which the autonomous vehicle and a user will engage in a goal location activity being in the vicinity of the precise goal location.

Implementations may include one or a combination of two or more of the following features. The precise goal location is the actual precise location of the user. The precise goal location is inferred from the signaling activities without the signaling activities conveying explicit location information. An identification of the general goal location is received from the user. The identification of the general goal location is received from a process. The identification of the general goal location is received from an external source at the autonomous vehicle. The determination of the precise goal location is based on a location indication signal sent by the user or a device of the user. The determination of the precise goal location is based on information received other than by the location signaling activities. The process bases the determination of the precise goal location on a known signaling mode having been used at least in part for the location signaling activities a position determination process. The process determines a bearing from the autonomous vehicle. The bearing is determined repeatedly. The process determines a distance from the autonomous vehicle. The distance is determined repeatedly. The process uses road data. The precise goal location changes over time.

In general, in an aspect, the autonomous vehicle system determines a precise location of a user in the vicinity of a general goal location to which the autonomous vehicle is proceeding, the precise location being determined based on wireless line-of-sight communication between the autonomous vehicle and the user.

Implementations may include one or a combination of two or more of the following features. The precise goal location is the actual precise location of the user. An identification of the general goal location is received from the user. An identification of the general goal location is received from a process. The identification of the general goal location being is received from an external source at the autonomous vehicle. The precise goal location is determined based on a location indication signal sent by the user or a device of the user. The determination of the precise goal location is based on information received other than by the location signaling activities. The process bases the determination of the precise goal location based on a known signaling mode having been used at least in part for the location signaling activities a position determination process. The process determines a bearing from the autonomous vehicle. The bearing is determined repeatedly. The process determines a distance from the autonomous vehicle. The distance is determined repeatedly. The process uses road data. The precise goal location changes over time. The signaling activities include the user or a signaling device associated with the user sending precise goal location information. The communication includes the autonomous vehicle sending information about its location. communication includes line of sight signaling. The communication includes sending messages through a central server. communication conveys information about a precise goal location in the vicinity of the general goal location. The communication includes controlling an application running on a mobile device. communication includes manually effected non-electronic signaling activities.

In general, in an aspect, two or more autonomous vehicles cooperatively determine a precise goal location of a user in the vicinity of a general goal location to which one of the autonomous vehicles is proceeding.

Implementations may include one or a combination of two or more of the following features. The precise goal location is in the vicinity of the general goal location. The precise goal location is the actual precise location of the user. The identification of the general goal location is received from the user. The identification of the general goal location is received from a process. The identification of the general goal location is received from an external source at the autonomous vehicle. The precise goal location is determined based on a location indication signal sent by the user or a device of the user. The precise goal location is based on information received other than by the location signaling activities. The process bases the determination of the precise goal location based on a known signaling mode having been used at least in part for the location signaling activities a position determination process. The process determines a bearing from the autonomous vehicle. The bearing is determined repeatedly. The process determines a distance from the autonomous vehicle. The distance is determined repeatedly. The process uses road data. The precise goal location changes over time.

In general, in an aspect, a hand-held device of a user signals to an autonomous vehicle that is proceeding toward a general goal location, a precise goal location.

Implementations may include one or a combination of two or more of the following features. The signaling includes line of sight signaling. The signaling includes sending messages through a central server. signaling includes controlling an application running on a mobile device. The location signaling activities involve a location indication signal. The precise goal location is the actual precise location of the user. The signaling includes electronic signaling or non-electronic signaling. The non-electronic signaling includes one or a combination of two or more of displaying an image or sequence of images, emitting a sequence of light signals, emitting a sequence of sound signals, emitting a wireless communication signal, or engaging in gestures or facial expressions. The electronic signaling includes signaling from one or a combination of two or more of a smartphone, a tablet, a smart watch, smart glasses, or other smart wearable device. signaling conforms to a commonly accepted protocol. The precise goal location changes over time. A detector in an infrastructure element receives signals that are part of the signaling and communicates with the autonomous vehicle or a user device based on the signals.

These and other aspects, features, implementations, and advantages can be expressed as methods, apparatus, systems, components, program products, business methods, means or steps for performing functions, and in other ways.

These and other aspects, features, implementations, and advantages will become apparent from the following description and from the claims.

DESCRIPTION

FIGS. 1 and 17 are block diagrams showing a process of picking up a rider.

FIGS. 3, 10, 15, 16, and 18 are schematic diagrams.

FIGS. 12, 14, 19, 20, and 22 are schematic diagram related to the location determination process.

The use of the following terms in this description are intended broadly and meant to include, for example, what is recited after each of the terms.

Goal location—a location that is set as a destination of the AV. The AV system plans a path, if one exists, and then executes that path, that takes the AV from its current location towards the goal location. This path may be updated multiple times by the AV system. The goal location may be a general goal location or a precise goal location, and these terms are defined below.

General location [of an object]—a location of the object (e.g., a goal, user, rider, or device) that may be specified imprecisely or inaccurately.

Precise location [of an object]—a location of the object (e.g., a goal, user, rider, device) that is specified precisely and accurately. The standard for what constitutes a precise location varies based on the application. In some applications of autonomous vehicles, a precise location may be one that is specified within an uncertainty of tens of centimetres.

Stopping place—an area that the vehicle occupies (identified by a defined shape, typically a rectangle, at a defined location in the world) and a direction in which a vehicle is facing when stopped at the stopping place.

Target stopping place—a stopping place in the vicinity of the goal location that is currently selected by the AV system and satisfies some predefined notion of acceptability and feasibility.

Location indication signal—a signal that is sent by a signaling device (typically in the possession of the rider) and received by stimulus detectors (typically on a vehicle, such as an autonomous vehicle) or other devices that is used to estimate the precise location of the signaling device. This signal may be transmitted using a variety of signaling modes, such as the ones described in this application. In some cases, the location indication signal may not include an explicit indication of a location but rather may be useful in inferring or deriving a location.

Figure 15:
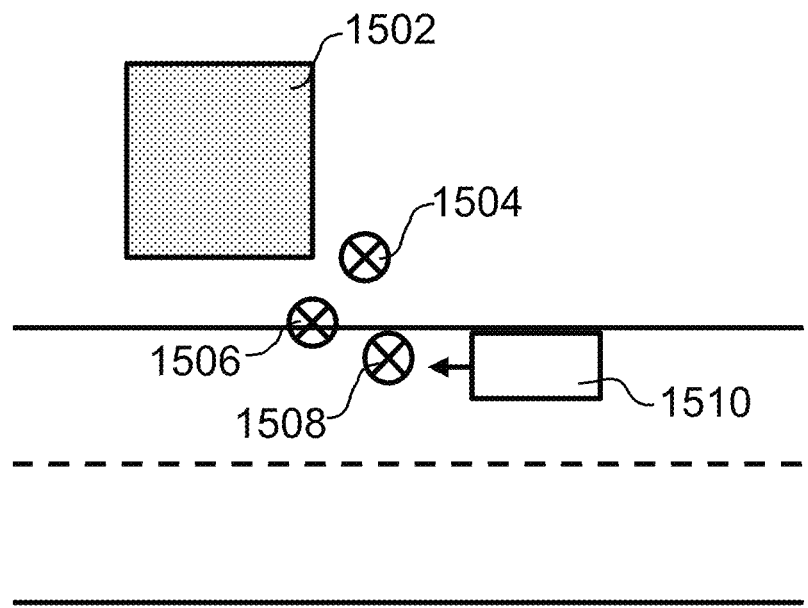

As shown in FIG. 15, here we describe systems and techniques for a rider who is to be picked up or dropped off by a vehicle, or has a parcel that is to be picked up or dropped off by a vehicle, such as an autonomous vehicle, to indicate (signal) to the vehicle or a driver of the vehicle, a precise location that is either the precise location of the rider 1504 or parcel, or a different precise location desired for the activity (pick-up or drop-off) 1508, or a different precise location nearby to the user's actual precise location 1506. This location is termed the precise goal location. We sometimes refer to such systems and techniques simply as a "location signaling system." Typically, a rider will book a request for a pick-up or drop-off activity; the request typically specifies a general goal location 1502, such as a building.

The vehicle then typically comes to a stop at a stopping place 1510 as close to this precise goal location as possible. The user can then enter the vehicle or deposit or pick up the parcel. In some implementations of the systems and techniques that we describe here, the precise goal location is communicated (signaled) to the vehicle or the driver from a device using one or more wireless signaling modes.

We use the phrase "rider" broadly to include, for example, any person in any context who wishes to ride in (alone or with others), hire for service, cause a delivery to be made by, receive a delivery being made by, or otherwise make use of a vehicle (such as an autonomous vehicle).

We use the term "hire (or hired) a vehicle for service" broadly to include, for example, to obtain access in any way and in any context to a vehicle for the purpose of, for example, riding in the vehicle, causing a delivery to be made by the vehicle, receiving a delivery being made by the vehicle, or otherwise making use of the vehicle.

Although we sometimes refer in our discussion to autonomous vehicles, the location signaling system could also be used for semi-autonomous vehicles and in some contexts for other kinds of vehicles driven in other ways. We sometimes use the term "autonomous vehicle" or simply "vehicle" to refer broadly to any such autonomous or semi-autonomous or other kind of vehicle.

Autonomous vehicles, including their components (such as sensors, actuators, and communication devices), and capabilities (such as the capability to detect features of the environment around the vehicle and make appropriate decisions) are detailed in U.S. patent application Ser. No. 15/240,072, filed on Aug. 18, 2016, and incorporated in its entirety here by reference.

We note in particular that an autonomous vehicle is capable of reacting to detected visual or other physical features in the environment, including shapes, colors, textures, movements, human gestures, flashing lights, and other visual stimuli. Autonomous vehicles may also be equipped with auditory sensors to capture and react to sounds in the environment. We will refer to these visual and auditory capabilities and devices and a broad range of other detection capabilities and devices present in autonomous vehicles used with a location signaling system by the general phrase "stimulus detectors."

Conventionally, vehicles (such as taxicabs and vehicles being driven by people for ride-hailing services or to transport a parcel) can be hired for service by a rider using a ride hailing software process that may run on a processor unit embedded within a smartphone, laptop, tablet, or other computing device or other device. The rider typically inputs to the ride hailing software process a ride request, which includes a general goal location for a pick-up activity and may also include a general goal location for a drop-off activity.

The general goal location can be specified by the user as an intersection (i.e. "the corner of Broadway and Main Street"), a street address, or the name of a building, park, square, monument, landmark, or other general location. The user may specify the general goal location using software such as Google Maps, which allows users to search for locations from various databases that store information about various locations. In these cases, a software process usually converts the location into a coordinate (latitude and longitude) using a geocoding service, for example, Google Maps. In some cases, the rider may specify an exact coordinate (latitude and longitude), for example, by dropping a pin on a map. In some cases, the desired general goal location is automatically identified by a software process that estimates the location of the device that was used to emit the position signal, using known geo-location methods based on GPS or other methods. The general goal location is therefore a representation of the location where the user desires the pick-up or other activity take place—but it may suffer from the following deficiencies:

1. It may be imprecise, i.e., the representation used may not sufficiently precise for an autonomous vehicle to unambiguously know where exactly in space the location lies. For example, the general goal location may be specified as a building, which may have multiple locations around it where an autonomous vehicle could potentially stop to perform a pick-up activity. As another example, when the general goal location is set as the user's location at the time of the ride request as estimated using methods such as GPS, there is often a significant error or uncertainty associated with that estimate. For instance, GPS location estimates can have errors up to tens or even hundreds of meters.

2. It may be inaccurate, i.e., the general goal location specified in the ride request may differ from the location where the user actually desires the pick-up activity to take place. This can occur due to erroneous input by the rider, uncertainty or error in the automatic identification of the requesting device's location, uncertainty inherent in the location of the building, park, square, monument, or other location, or a change of mind on the user's part after making the ride request, or other reasons or combinations of them.

The precise goal location, on the other hand, is both precise (in that it refers to a location in space, complying with some pre-defined standard for precision) and accurate (in that it is assumed to represent the actual location where the rider desires that the activity take place). For example, the precise goal location may be specified by a latitude and longitude, whose error is restricted to be within a pre-defined amount, say one square meter.

In some typical uses of autonomous vehicles, the general goal location may be specified by an algorithm (which may be located on a centralized server in the cloud and tasked with, for example, optimizing the locations of a fleet of autonomous vehicles with a goal of minimizing rider wait times when signaling to a vehicle). For an example of a previous scientific work related to this subject, see Spieser, Kevin, et al. "Toward a systematic approach to the design and evaluation of automated mobility-on-demand systems: A case study in Singapore." Road Vehicle Automation. Springer International Publishing, 2014. 229-245.

In some cases, the general goal location may be provided by another process (e.g., an emergency process that identifies the nearest hospital as the general goal position due to a detected medical emergency on board the vehicle). Again, for example, the general goal location may not indicate the actual precise location of the rider (e.g., it may indicate the actual location of the rider imprecisely or inaccurately), due to uncertainty inherent in the algorithmically-determined general goal location.

In some cases, a potential rider may use a hailing device (such as a smartphone) to broadcast a hailing signal, which indicates the potential rider's desire to hail a vehicle. This hailing signal may then be detected and processed by stimulus detectors located on a vehicle, such as an autonomous vehicle. Such a hailing system is described in U.S. patent application Ser. No. 15/240,072, filed on Aug. 18, 2016, and incorporated in its entirety here by reference. In such cases, the hailing signal itself could also serve as a location indication signal. When processing such a signal, in addition to processing the hailing signal, the location indication signal may also be processed and the precise goal position for the pick-up determined.

Figure 1:
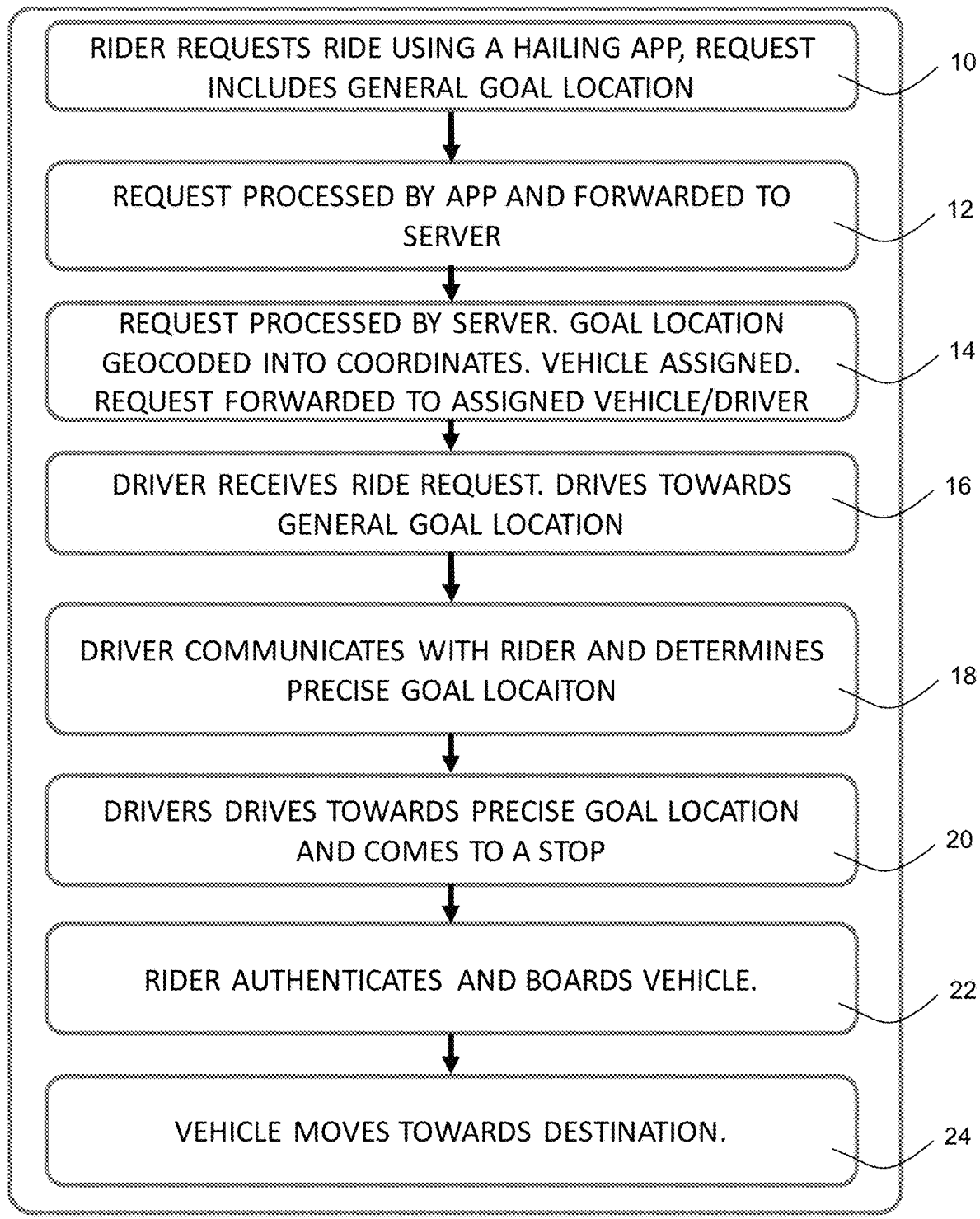
Figure 16:
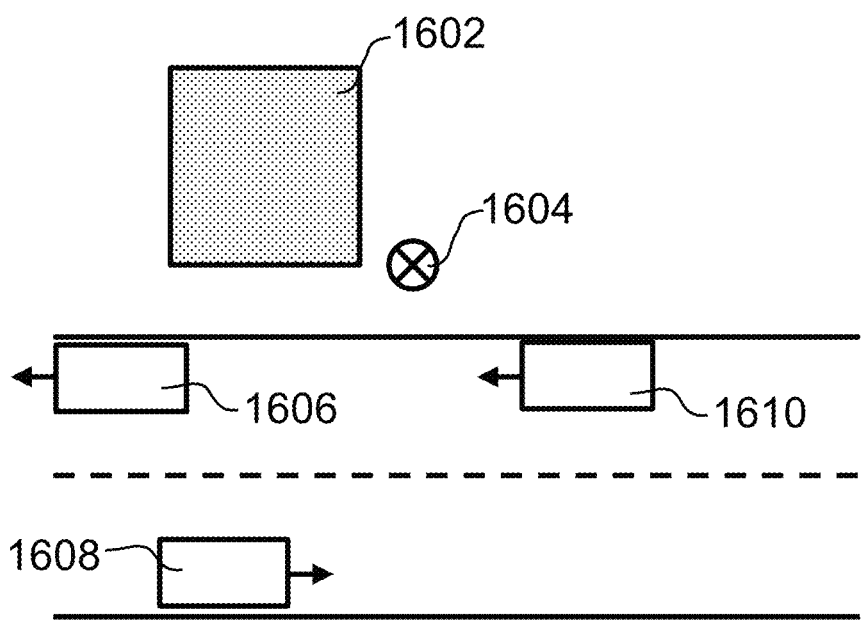

In known systems, as shown in FIG. 1, the general goal location of a requested ride to be provided by a vehicle having a driver is communicated 12 wirelessly to a centralized server tasked with assigning movement directions to one or more, or potentially a large fleet (e.g., hundreds or thousands) of vehicles. The centralized server then runs 14 a routing software process that provides by wireless communication to a particular vehicle (the assigned vehicle) the rider's general goal location. The assigned vehicle then is driven 16 towards the general goal location to meet the rider. Often, as the assigned vehicle 1601 approaches the general goal location 1602, it has difficulty meeting the rider 1605, as shown in FIG. 16, because the driver has only knowledge of the general goal location 1602, and there may be many possible stopping places (for example, 1606, 1608 and 1610) in the vicinity of the general goal location. Some of these stopping places may be less suitable than others, because, for example, some of them are farther away from the rider's actual location 1604 than others. Therefore, it may be desirable to determine a precise goal location that is suitable for the given activity—and then find a stopping place at or in the vicinity of that precise goal location.

In order to determine a precise goal location, as shown in FIG. 15, the driver often communicates by phone or text or both with the rider to learn the rider's precise location 1504, or other desired precise goal location 1508, and this communication process may be time consuming and undesirable. (This communication may be impossible in the context of an autonomous vehicle.) The driver of the vehicle then travels towards this precise goal location, comes to a stop at a stopping place 1510 in the vicinity of the precise goal location, and the rider enters the vehicle. Once the rider enters the vehicle and completes an identification process (not necessarily in that order), the vehicle is considered hired for service and begins the journey to the desired drop-off location.

Figure 17:
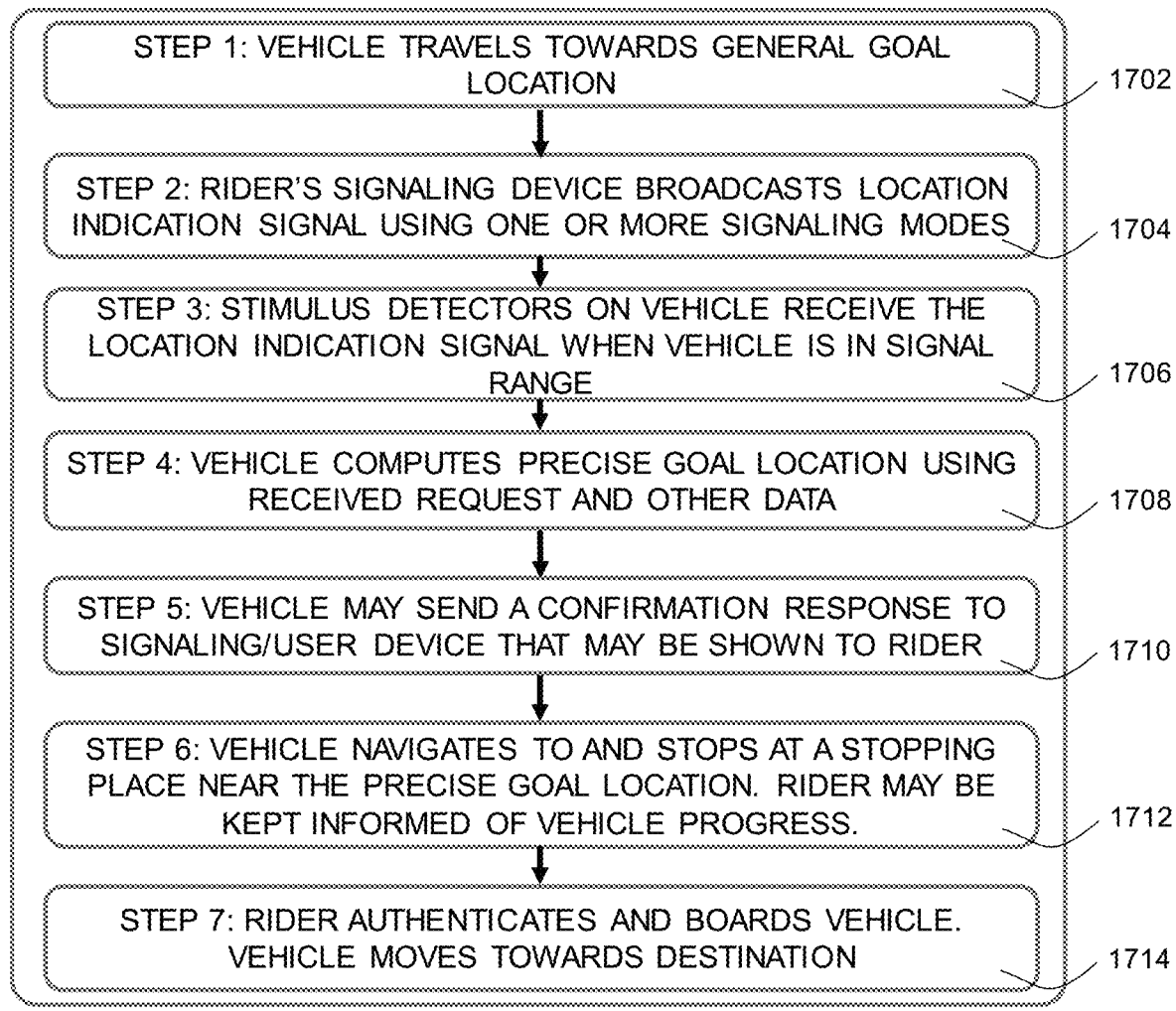
Figure 18:
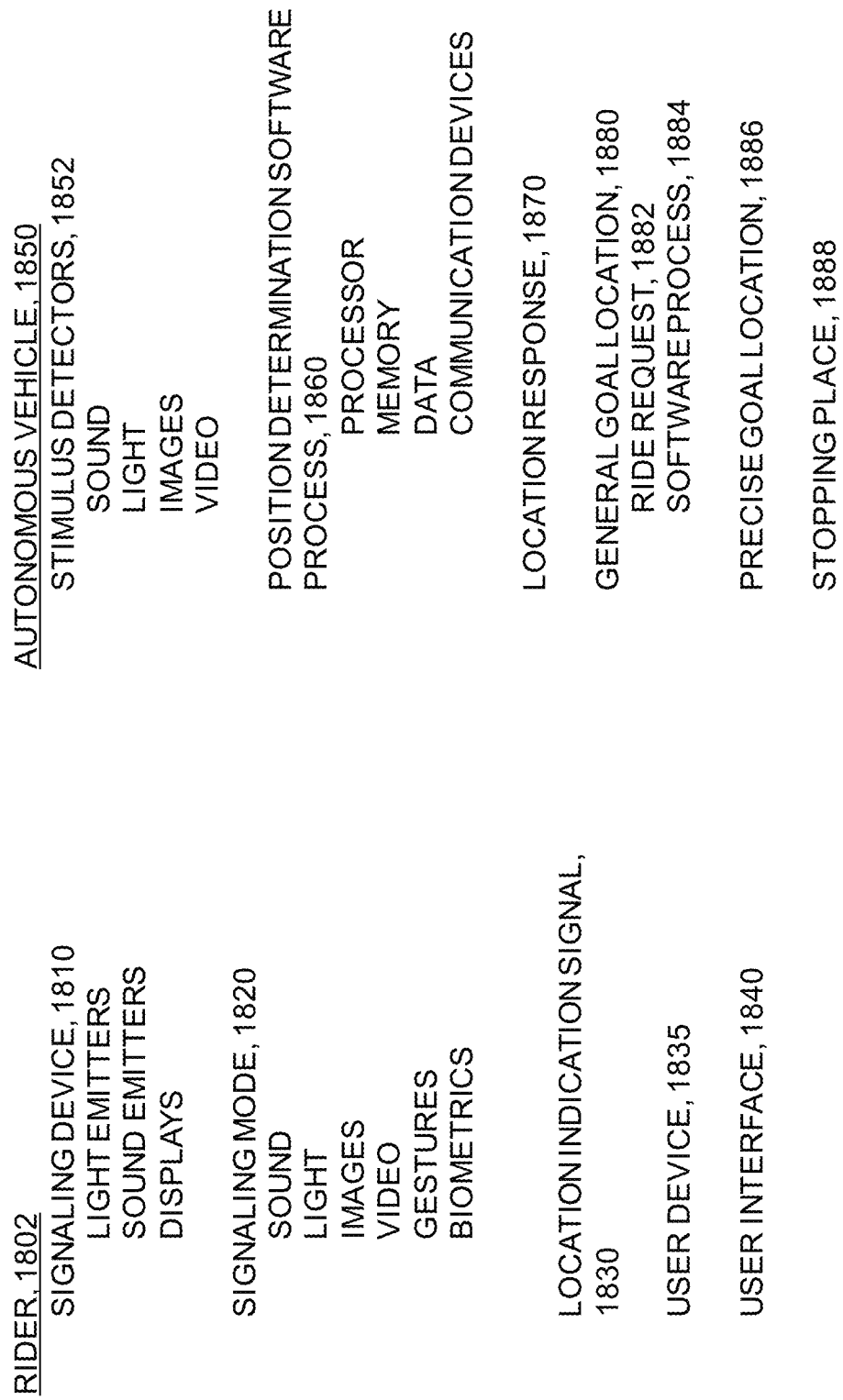

The flowchart of FIG. 17 and the diagram of FIG. 18 illustrate an example pick-up process, for example, for an autonomous vehicle, employing the location signaling system described here.

Step 1 (1702): A vehicle (for example, an autonomous vehicle 1850) has typically traveled from an initial location to a general vicinity of the rider, based on a general goal location 1880 provided to the vehicle by the rider 1802 in a ride request 1882, or by a software process 1884 running on the central server, or other source.

Step 2 (1704): The rider uses a signaling device 1810 employing one or a combination of two or more of a variety of signaling modes 1820 discussed below to broadcast a location indication signal 1830.

Step 3 (1706): This location indication signal is received, for example, by the stimulus detectors 1852 present on one or more nearby (moving or parked) autonomous vehicles that are within the range of the signal.

Step 4 (1708): A software process 1860 running on the autonomous vehicle, or on a central server or both as part of the AV system, analyses the information transmitted from the signaling device in the location indication signal, for example, by the rider and captured by the stimulus devices, potentially in combination with road data and other information, to determine a precise goal location 1886 for the rider.

Step 5 (1710): The autonomous vehicle or the AV system may send a location response 1870 to the signaling device or the user device 1835 (which may or may not be the same as the signaling device) or both, and this response may include confirmation that the location indication signal was received and processed and the precise goal location that was determined, among other things. This response may be received by the signaling device or the user device or shown to the user via a user interface 1840 or both. This response may be sent via the Internet or cellular network, or through other signaling modes that have been established between the autonomous vehicle or other elements of the AV system and the signaling device or user device.

Step 6 (1712): The autonomous vehicle then attempts to navigate to and come to a stop at a stopping place 1888 that is, typically, as close to this precise goal location as possible (though other criteria may also be used). The rider may be kept informed of the progress of the autonomous vehicle via the signaling device or other user device.

Step 7 (1714): The rider can then enter the vehicle and complete an authentication process (not necessarily in that order), and the vehicle can begin its journey to the desired drop-off location.

We use the term "signaling device" broadly to include, for example, any device, equipment, apparatus, or system by which information about the precise goal location for the rider's pick-up can be sent to the autonomous vehicle or to another element of the AV system. Examples of signaling devices are given later in the description, in conjunction with exemplary signaling modes. Examples of the information could be a coordinate, a pointer on a map, a position that is described relative to a known landmark or landmarks, a booking identification, a vehicle identification, a vehicle class of service, and information about the type of signaling device being employed (which may include information about the device display size and other properties.

We use the term "signaling mode" broadly to include, for example, any form in which information can be sent by wireless signals or other methods, including non-electronic methods. Among others, the signaling mode can include displaying an image or sequence of images, emitting a sequence of light signals, emitting a sequence of sound signals, emitting a wireless communication signal, or engaging in gestures or facial expressions, to name a few.

In most cases, the signaling device and signaling mode are designed or operated or both to increase the incidence rate of true detections (i.e., scenarios in which the autonomous vehicle or other elements of the AV system correctly identifies that a signal containing information about a rider's precise goal location has been directed to the vehicle) and to reduce the incidence rate of false detections (i.e., scenarios in which an autonomous vehicle incorrectly identifies that a signal containing information about a rider's precise goal location has been directed to the vehicle, when none has been sent or one has been sent to another vehicle, for example).

The rider can signal to the autonomous vehicle using a signaling device such as a mobile device, or a wide variety of other devices such as smartphones, tablets, smart wearable devices such as smart watches, or smart glasses.

In some instances, the signaling mode may be performed by a rider (or someone else, such as a companion) using a portable signaling device (e.g., a smartphone). In some cases, the signaling mode may be typical human capabilities performed by a rider (or someone on her behalf) without using any signaling device, but rather using other signaling modes, such as a hand or facial expression, a head pose, or other gesture or whistling, yelling, or making another sound (or another mode) to signal a location or provide other information. In some cases, the signaling mode may be a human signaling mode that is performed passively, without the rider actively emitting a signal of any type, but rather by stimulus detectors on the vehicle identifying the actual precise location of the rider using recognition of known biometric markers (e.g. facial recognition). Combinations of two or more of the signaling modes can be used.

A signaling mode can comply with a predefined or commonly accepted signaling protocol that could specify the aspects of the location indication signal—that is the manner in which the signaling device is to operate or the signaling mode is to be performed, the information that is to be transmitted, its format, and a wide variety of other aspects. A wide variety of entities that operate individual autonomous vehicles and fleets of them to be hired for service and entities that produce software, hardware, and other equipment for use in autonomous vehicles and signaling devices can subscribe to such a signaling protocol. For example, the signaling protocol could specify the signaling mode to be used, such as a sequence of images displayed on the signaling device's screen. In that case, the signaling protocol could also specify the exact images that are to be displayed (or some method for generating those images), the size of the images, the sequence of those images, the duration for which each image in the sequence is to be displayed, the brightness of the screen that is displaying the images, and other relevant features of the location indication signal. These features of the location indication signal can be used to encode information that is useful in processing the signal, for instance, information related to the booking request, or the rider, or the assigned vehicle or other relevant information.

A signaling device can include, for example, one or more of the following (and a wide variety of others):

1. A smart phone, tablet, handheld PC, wearable device such as a smart watch, or other configurable mobile device that is equipped with at least a processor, a memory unit, an input device or process associated with a user interface, and (in some cases is equipped with) a display screen, light-emitting diode(s), luminescent material, e-ink screen, or other light emitting or light modulating medium. Such display and light-emitting media may be able to exhibit or modulate sequences of images, colors, or lights or a combination of any two or more of them and other visual indications. The signaling device may be equipped with one or more video sensors capable of detecting visual features in the environment. The device may be equipped with one or more microphones or speakers (or other sound-emitters) or both that enable the capability to detect and emit sound. The device may be equipped with wired or wireless receivers and transmitters that enable it to communicate with, among other things, a central cloud or servers.

2. A printed paper or card.

3. A whistle or other noisemaker, including programmable noisemakers equipped with at least a processor and speaker, and potentially a microphone.

Some implementations may include a signal broadcasting process 3420 running on the signalling device. This process broadcasts a location indication signal that may be an image based signal 3422, or a light based signal 3424, or a sound based signal 3426, or may use some other signalling mode.

Some implementations may include a signal decoding process 3402, running on the autonomous vehicle or a central server or some other part of the AV system, which processes a location indication signal received by a stimulus detector located on an AV or other location. This process may be able to process various aspects of the location indication signal, such as but not limited to, geometric elements 3404, colour (black and white, grayscale, colour) 3406, texture 3408, facial recognition 3410, gestures 3412, modulation of light 3414 and modulation of sound 3416.

Some implementations may include a location determination process 3440, running on the autonomous vehicle or a central server or some other part of the AV system, which uses the information inferred from the location indication signal, potentially in combination with the outputs of a signal decoding process for the purpose of determining a precise goal location. This may involve one or more of the following: bearing determination 3442 of the signaling device with respect to the stimulus detector, distance determination 3442 of the signaling device with respect to the stimulus detector, or other methods. Distance determination may involve a scale analysis process 3444 that analyses the scale of an image or geometric elements in a location indication signal.

Signaling Modes

The signaling modes can include one or a combination of two or more of the following. (Generally, though not always, these signaling modes are relevant for a rider who is signaling to a nearby autonomous vehicle, where "nearby" may be considered to be when the vehicle is, for example, within audible range of an emitted sound of moderate volume or within line-of-sight at a range where features on the scale of a few centimeters might reasonably be resolved by typical sensors on an autonomous vehicle.)

Typically, it is possible to identify a relative heading from a detected emitted signal to a relevant vehicle stimulus detector since the activated stimulus detector elements (e.g., certain pixels in a vision sensor) are generally precisely calibrated with respect to external stimuli.

For example, in order to identify the relative heading from a detected emitted sound to relevant vehicle stimulus detector(s) (e.g., microphones), a microphone array arranged in a surrounding fashion around a vehicle central point is required. Then, the difference in detection time of the detected emitted sound by the various sensor elements in the array can be analyzed to compute the bearing from the center of the microphone array to the detected emitted sound using standard techniques.

The following are some examples of possible signaling modes.

Image Display

Signaling to a nearby autonomous vehicle may be achieved by displaying a particular image or sequence of images (for example, displayed alternating at a fixed repeat rate) on a signaling device in a manner (e.g., presenting the device in an orientation such that the image or images are displayed toward the roadway at shoulder height or above) that is likely to lie within a visual line of sight of, for example, video sensors mounted on a nearby autonomous vehicle.

Emitting Light

Signaling to a nearby autonomous vehicle may be achieved by emitting light from a signaling device in a manner (e.g., presenting the device in an orientation such that the emitted light is directed toward the roadway at shoulder height or above) that is likely to lie within a visual line of sight of video sensors mounted on an autonomous vehicle (e.g., from a sidewalk or road edge, or by a rider who is standing at an intersection).

Gesturing

Signaling to a nearby autonomous vehicle may be achieved by performing a (e.g., uncommon) gesture or sequence of gestures at a position and in an orientation that is likely to lie within visual line of sight of video or LIDAR sensors mounted on an autonomous vehicle (e.g., from a sidewalk or road edge, or when a rider is standing at an intersection). A software process running on a processor mounted on the autonomous vehicle would then analyze captured data from the video or LIDAR sensors to detect the presence of the gesture(s) that are intended to represent a position signal.

Emitting Sounds

Signaling to a nearby autonomous vehicle may be achieved by emitting from a signaling device (here including a smartphone or similar device, a whistle or similar device, or the rider using her mouth) an uncommon sound or sequence of sounds of sufficient volume that they can be detected by sensors mounted on a nearby autonomous vehicle and not produce incidences of false detection. The emitting of the sound and the features and characteristics of the emitted sound can be controlled and modulated by one of the encoding or sound modulation processes running on a signaling device.

U.S. patent application Ser. No. 15/240,072, filed on Aug. 18, 2016, and incorporated in its entirety here by reference, provides details of the signals, e.g., sounds, gestures, light, or images, or combinations of them that may be emitted, and the properties associated with that signal. The referenced application also details methods related to encoding information (eg. a unique ride request or booking ID) into the signal. The referenced application refers to "haling device" and "hailing request", which in the context of the current application, should be understood to refer to the "signaling device" and the "location indication signal" respectively.

Passive Signaling Via Biometrics-Based Identification of Riders

Location signaling to a nearby autonomous vehicle may be achieved passively, that is, without the rider actively emitting a signal of any type either by human behavior or through a signaling device. This can be achieved by the operation of stimulus detectors on the vehicle identifying the rider using recognition of known biometric markers (e.g. facial recognition). In some implementations, relevant biometric information about a rider may have been provided explicitly to the taxi, limousine, ride-sharing, electronic hailing, or other transport service, for example, upon registration of a user account with the service.

A rider may be given an option by the transport service to provide or update this biometric information at the time of making a ride request (or at some other time before a pick-up or drop-off activity takes place) to improve the performance of the recognition process. For example, in the case of facial recognition, a user making a ride request from her smartphone may be requested to take a photo of herself using the camera on her smartphone, commonly known as taking a selfie, and this can be used as the biometric marker for the facial recognition process. This photo then captures the most current version of the user's appearance, and is likely to result in better matches than performing the recognition process on an older photo of the user, where the user may look different. Furthermore, using a current photograph allows the recognition process to use additional features that are applicable in the immediate situation such as the user's clothes or the background of the photo that could be ignored if using an older photograph as the biometric marker.

Given relevant biometric information such as a facial image, a vast range of known methods exist for automatic identification of specific individuals. Typical considerations associated with such applying the known methods that are relevant to the scenario discussed here include reliable and robust identification in variable or adverse lighting and environmental conditions, or at a wide variety of sensing ranges or orientations or combinations of those.

Combinations of Signaling Modes

Each of the various signaling modes that we have discussed can be used in combination with one or more of the other modes, and with additional modes not mentioned explicitly. Using modes in combination can reduce the incidence rate of false detections. For example, a signaling mode may rely on executing a particular gesture (e.g., waving one's arm above one's head) while displaying a signaling device that is emitting a particular temporal sequence of colors. A wide range of other combinations of signaling modes are also possible.

Processing Received Signals to Determine a Precise Goal Location of a Rider

As shown in FIG. 18, once one or more stimulus detectors 1852 on the autonomous vehicle 1850 detects a location indication signal 1830 or signals communicated using one or more of the signaling modes 1820 and signaling devices 1810 described above or other signaling modes or signaling devices, a processor on the autonomous vehicle or in the AV system runs a position determination process 1860 that analyses the information contained in the location indication signal and, among other things, computes the precise location of the signaling device or otherwise processes the location signal to derive the precise goal location 1886 of the rider 1802.

In some implementations, it is useful or necessary for the particular signaling mode or modes that are used to be known a priori to both the signal receiver and the signaling device or devices. Prior knowledge of the particular signaling mode or modes increases the likelihood that the stimulus detector or detectors will reliably detect emitted location signals, using commonly known signal detection and classification methods. Examples of signal detection and classification methods for visual, auditory, gestural, and biometric-based signaling modes include, for example, supervised classification methods based on deep learning, support vector machines, neural networks, and other techniques and combinations of them.

The process for determination of the precise goal location for a rider's pick-up can be accomplished using multiple methods, three of which are described below.

Figure 19:
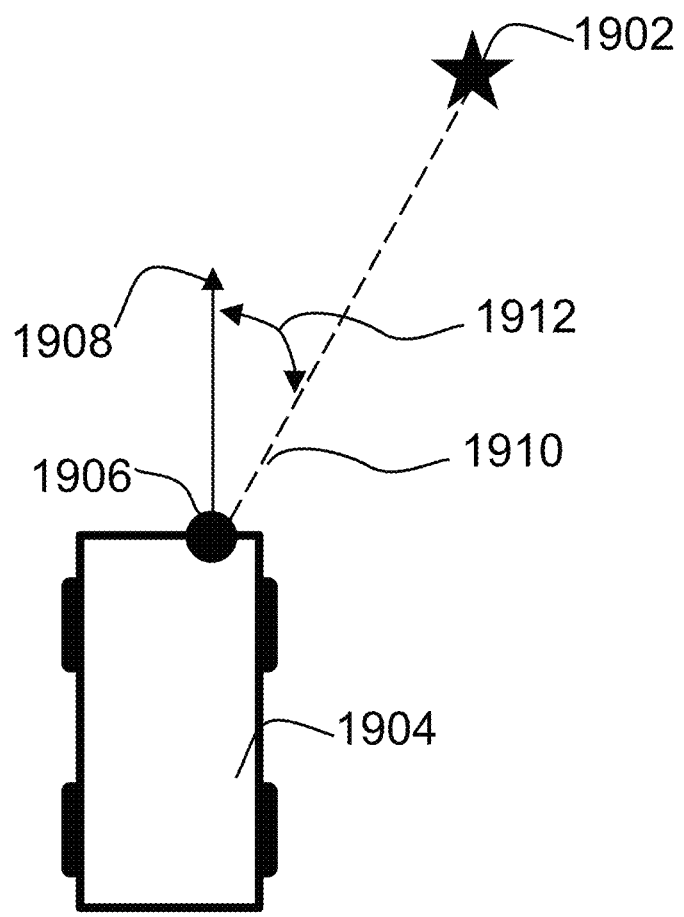

FIG. 19 illustrates the term "bearing" of an object 1902 with respect to a stimulus detector 1906 on an autonomous vehicle 1904, which is used in the methods described below.

The bearing of the object 1910 with respect to the stimulus detector on the AV is defined as the angle 1912, measured in a clockwise direction, between the direction that the car is facing (represented by the direction vector 1908) and the bearing ray 1910 (which is the line joining the stimulus detector and the object).

Figure 20:
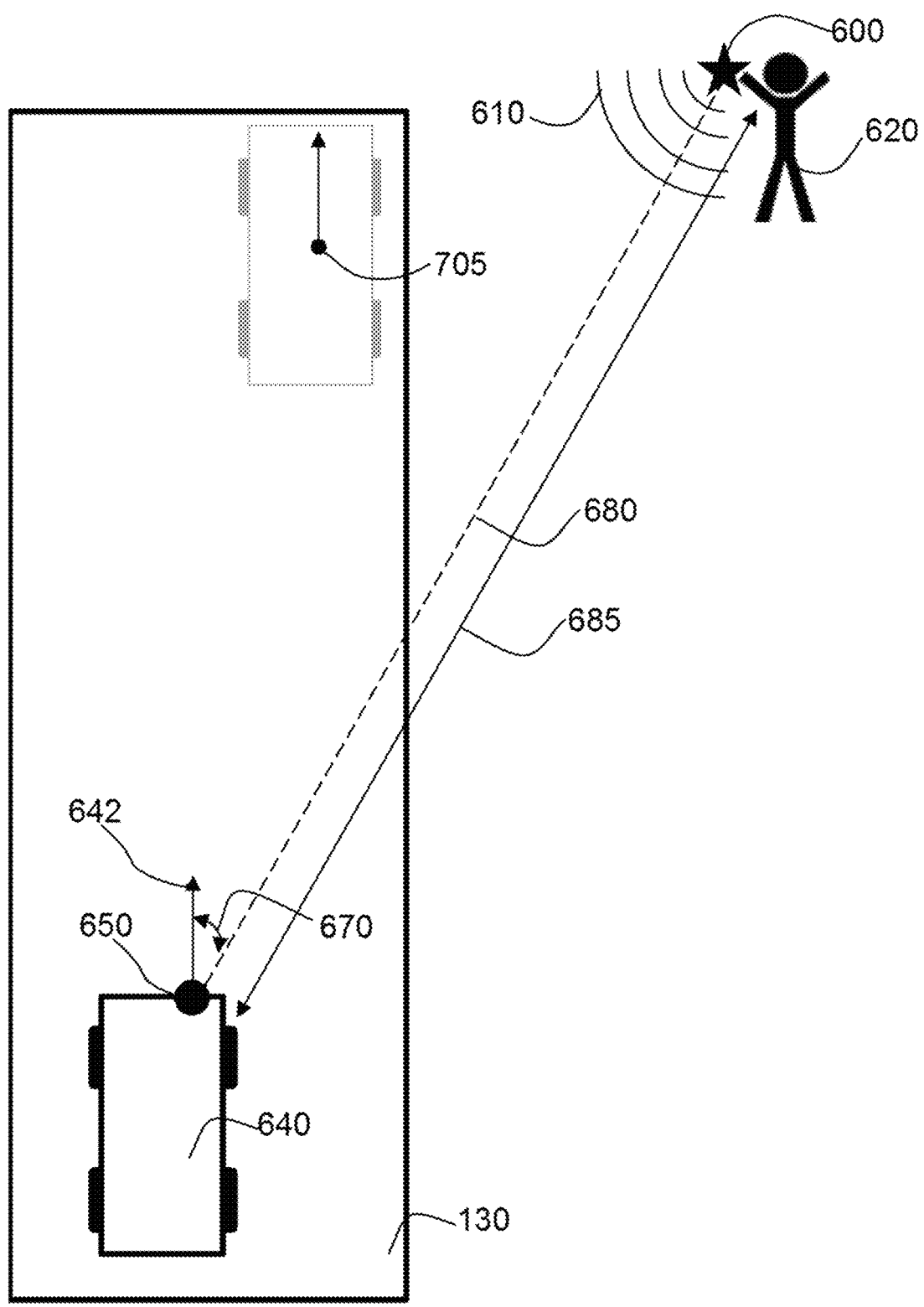
Figure 21:
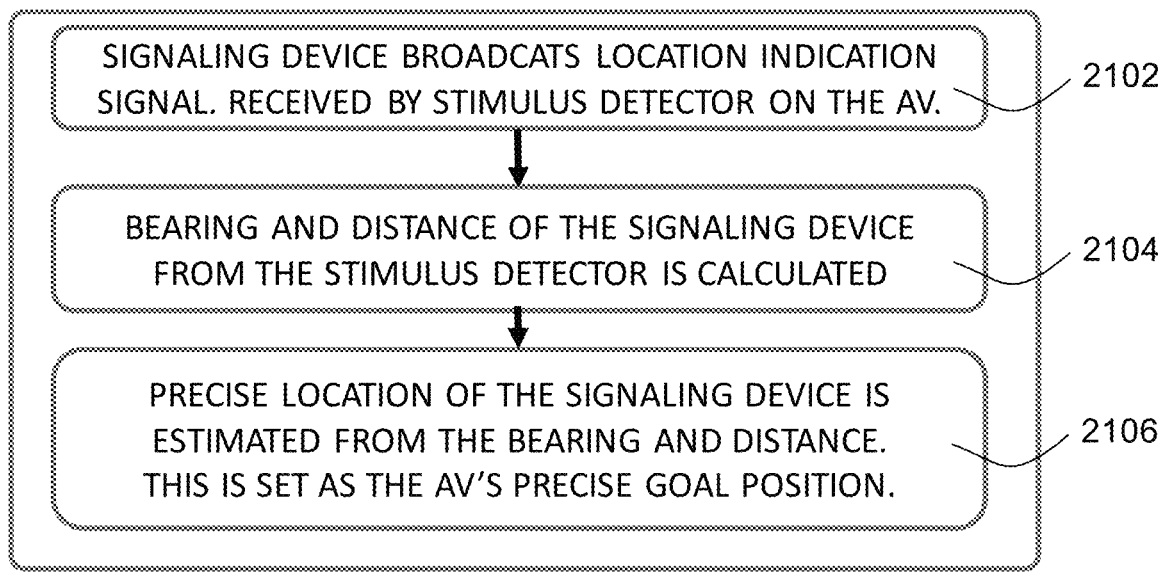

In some implementations, the precise goal location can determined by the following steps, as illustrated in FIG. 20 and the flowchart of FIG. 21:

1. The user's signaling device 600 broadcasts a location indication signal 610 that is detected by the stimulus detector 650 located on the autonomous vehicle 640 that is traveling in the direction 642. The bearing 670 of the signaling device (i.e. the center of the signaling device, or some other point with a known relationship to the center of the signaling device) with respect to the stimulus detector (i.e. the center of the stimulus detector, or some other point with a known relationship to the center of the stimulus detector) may be computed as explained previously.

2. The distance 685 from the signaling device to the stimulus detector may be computed in multiple ways, including:

a. The distance may be computed by analysis of the detected scale of a visual feature (e.g., an image or light field) of known size that is emitted by the signaling device. For example, FIG. 22 shows a signaling device 600 emitting a position request using visual features 750, and the image 760 that is captured by the stimulus detectors on the autonomous vehicle (all objects except the expected visual features have been filtered from the image). In some cases, a scale analysis process on the vehicle compares the size 775 of the visual feature 770 measured from data produced by the stimulus detector or detectors on the autonomous vehicle to the a priori known size 755 of the visual feature 750. From such a comparison, given known resolution properties of the stimulus detectors, the distance 685 from the stimulus detector or detectors to the signaling device can be computed using known geometric analysis methods.

This method implies that the scale analysis process running, for example, on the vehicle has prior knowledge of the actual size of the visual feature that is emitted by the signaling device. Such prior knowledge could be shared wirelessly at many moments during the vehicle booking process, including at initiation of the booking request or in the location indication signal 610, or as part of the signaling protocol that the autonomous vehicle is aware of and complies with. Given such prior knowledge, standard techniques can be employed to compute the scale of the visual feature as detected by stimulus detectors on the autonomous vehicle and therefore compute the distance from the stimulus detector and the signaling device, or from other points with known spatial relationships to the stimulus detector (for example, the center of the autonomous vehicle) and signaling device.

b. The distance may be computed using knowledge of the bearing 670 (as determined, for example, in the manner described earlier) in conjunction with information from one or more sensors located on the vehicle. For example, some autonomous vehicles come equipped with LIDAR sensors which can send out laser light in all directions and determine with a high degree of precision the distance to the first obstacle in the path of each of these beams. Given knowledge of the bearing of the signaling device with respect to the current location of the AV, an AV that is equipped with such a LIDAR sensor, may emit LIDAR light in the known direction of the signaling device. The LIDAR light would then be expected to reflect off the signaling device and/or rider, allowing for an estimate of the distance between the AV and the signaling device. Alternatively, the LIDAR may have already emitted light in the direction of the signaling device in the recent past, and the distance may be computed from that event. In a similar manner, given knowledge of the bearing of the signaling device, and potentially some known characteristics of the signaling device or the user, other sensors such as stereoscopic or monocular video cameras or RADAR may be used to determine the distance of the signaling device from the AV. Such a search may be said to be directed because of the prior knowledge of the bearing of the signaling device and is more efficient as the search space is reduced.

The distance may be determined repeatedly.

3. Given an estimate of the bearing 670 and distance 685 computed in steps 1 and 2, and using knowledge of the vehicle's precise location, the precise location of the signaling device 600 may be estimated. This may also be the precise location of the user, for example, if the signaling device is known to be held by the user in her hands, such as, a smartphone. Alternatively, the precise position of the user may also be estimated if the position of the user with respect to the precise location of the signaling device is known (for example, if the signaling device is a fixed kiosk of some sort, it may be possible to detect or estimate exactly where the user is standing to use the kiosk). Typically, the AV system then sets the precise location of the signaling device or the rider as the precise goal location.

This method can be employed, for example, with signaling modes discussed above that use the display of images and emission of light and potentially other signaling modes not discussed here.

Figure 13:
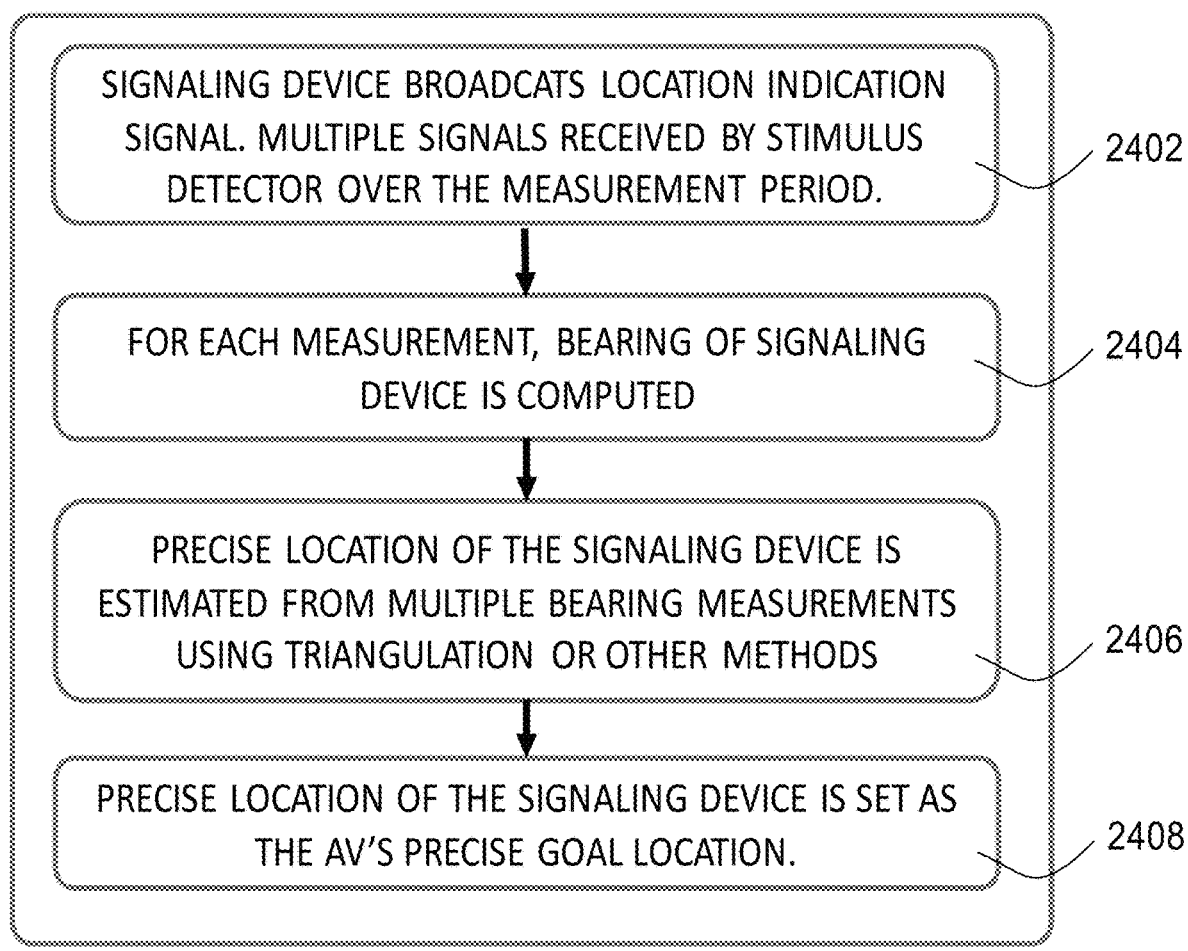
Figure 14:
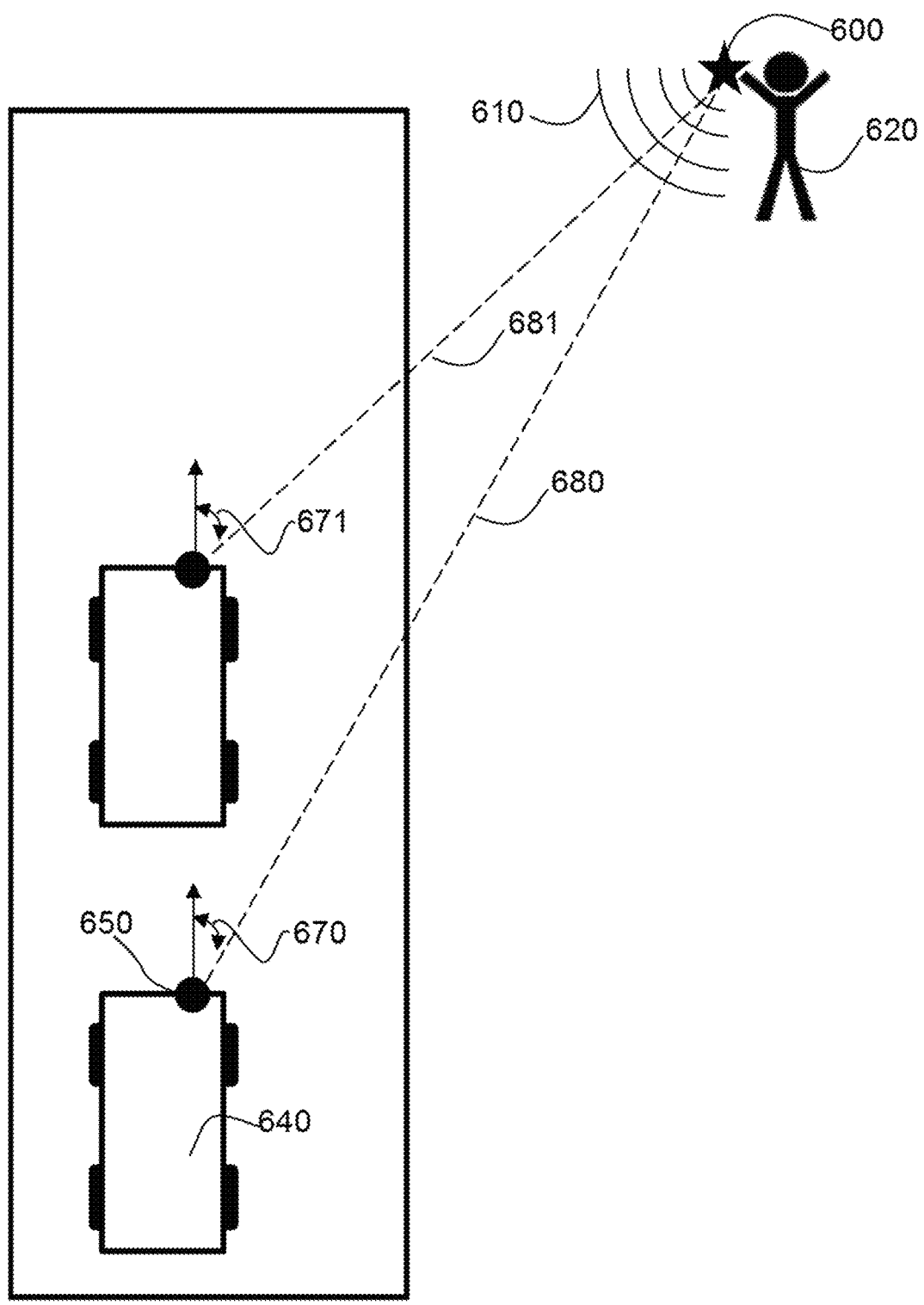

In some instances, the precise goal location can be determined by the following steps, as illustrated in FIG. 14 and the flowchart of FIG. 13:

1. The user's signaling device 600 broadcasts a location indication signal 610 that is detected by the stimulus detector 650 located on the autonomous vehicle 640 that is traveling in the direction 642. The bearing 670 of the signaling device (i.e., the center of the signaling device, or some other point with a known relationship to the center of the signaling device) with respect to the stimulus detector (i.e., the center of the stimulus detector, or some other point with a known relationship to the center of the stimulus detector) may be computed as explained previously. This computation of the bearing is performed repeatedly over a period of time (the measurement period) when the vehicle is in motion. As the vehicle moves, the bearing of the signaling device is likely to change. FIG. 14 shows the autonomous vehicle 640 at two different locations at two points in time and the bearing of the signaling device with respect to the stimulus detector is computed at each location.

The duration of the measurement period depends on the frequency of measurement (for example, if the stimulus detectors can perform a measurement once every second, the measurement period would have to be at least 2 seconds long to acquire two measurements), the precision of the measurement (for example, if the measurement is not very precise, then performing a second measurement before the vehicle has moved by a substantial distance may yield a second measurement that is statistically indistinguishable from the first) and the number of measurements needed (more measurements would require a larger measurement period duration).

2. Using multiple measurements of the bearing, e.g., bearings 670 and 671, that are computed from different positions of the vehicle as the vehicle moves during the measurement period, the precise locations of the signaling device 600 and the rider 620 may be estimated. This computation assumes that the rider did not move during the measurement period—which may be a reasonable assumption if the measurement period is relatively small (for example, a fraction of a second)—or if the rider is moving much more slowly than the vehicle. This computation may be performed by many known methods, for example, triangulation. In its simplest version, triangulation uses two measurements of the bearing of the signaling device (for example, 670 and 671 from FIG. 14) taken from two different positions of the vehicle. The signaling device is then estimated to be located at the intersection of the two bearing rays (680 and 681) which is a unique point. This method can be extended to multiple (i.e., greater than two) measurements, for example, by estimating the precise position of the signaling device as the point that minimizes the sum of squared distances from that point to each of the bearing rays (the distance to a ray is measured perpendicularly to the direction of that ray).

3. The precise location of the device may also be the precise location of the user, for example, if the signaling device is known to be held by the user in her hands, such as, a smartphone. Alternatively, the position of the user may also be estimated if the position of the user with respect to the signaling device is known (for example, if the signaling device is a fixed kiosk of some sort, it may be possible to detect or estimate exactly where the user is standing to use the kiosk). Typically, the AV system then sets the precise location of the signaling device or the rider as the precise goal location.

This method can be employed with any of the signaling modes discussed here, and potentially other signaling modes.

Figure 11:
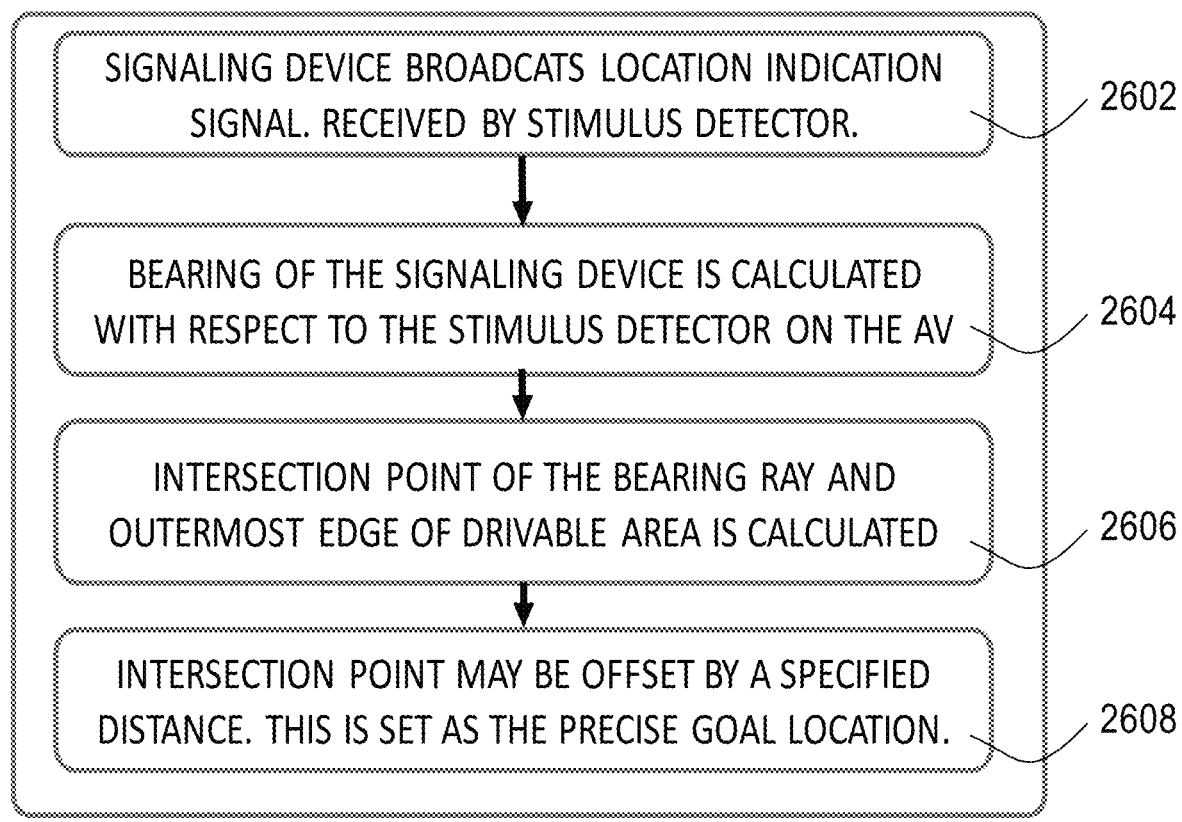
FIGS. 11, 13 and 21 are block diagrams related to the location determination process.
Figure 12:
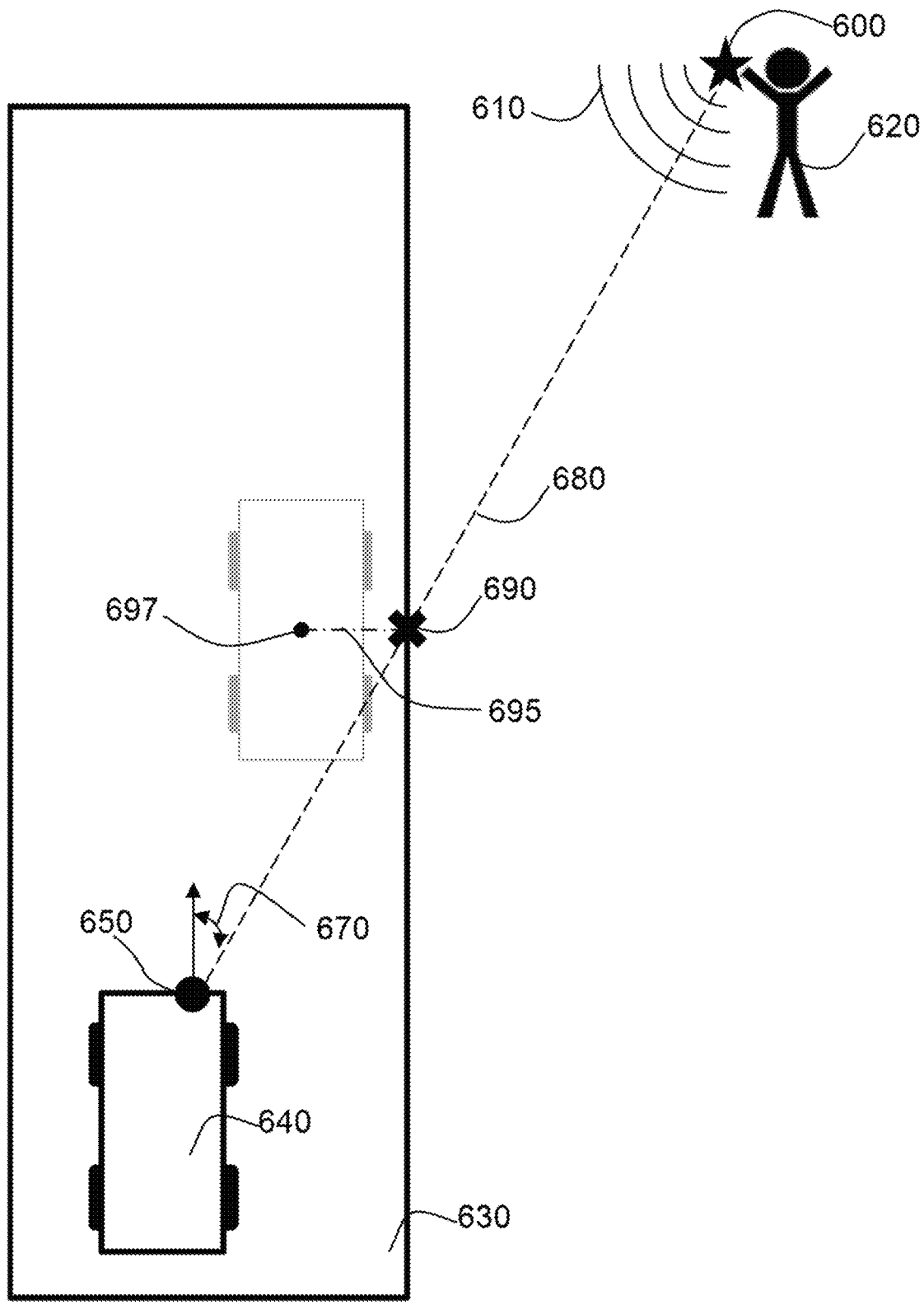

In some examples, the precise goal location can be determined in the following way, as illustrated in FIG. 12 and the flowchart of FIG. 11:

1. The user's signaling device 600 broadcasts a location indication signal 610 that is detected by the stimulus detector 650 located on the autonomous vehicle 640 that is traveling in the direction 642. The bearing 670 of the signaling device (i.e., the center of the signaling device, or some other point with a known relationship to the center of the signaling device) with respect to the stimulus detector (i.e., the center of the stimulus detector, or some other point with a known relationship to the center of the stimulus detector) may be computed as explained previously.

2. Given knowledge of the bearing 670 of the signaling device, and given road data information related to the boundary of the drivable road surface 630, the intersection point 690 is computed between the bearing ray 680 and the outermost (e.g., with the furthest distance from the vehicle) boundary of the drivable road surface 630 as identified in the road data. Generally, the outermost boundary of the drivable road surface is a lane marking, curb, road edge, or other detected road boundary. In some implementations, the drivable road surface may be determined in real-time by the AV system, potentially in conjunction with a central server, using a combination of static road data information related to the position of lane boundaries, curbs, road edges, and information received in real-time from the AV's sensors, a central server or other entities such as AVs, infrastructure sensors, etc. For instance, a construction zone may be present on a portion of the map that has previously been marked as drivable, but the AV may be able to use its perception system in real-time to detect the presence of this construction zone, detect the boundaries of the construction zone, and modify the drivable road surface accordingly. This updated information may then be communicated back to the central server or to the AV system or to other AVs.

3. Given knowledge of the intersection point 690 computed in step 2, it can be set as the precise goal location. Alternatively, the precise goal location may be identified as 697 the location of the intersection point adjusted by a fixed offset distance 695, in order to offset the precise-pick up location from the edge of the drivable road surface.

This last method differs from the first two methods in that it only estimates the bearing of the signaling device (and the user) with respect to the autonomous vehicle and not the precise location of the signaling device. It uses the bearing to compute a precise goal location that is likely, but not guaranteed, to be accurate. This method may be used, for example, when the first two methods are not implementable, e.g., if it is not possible to determine the distance between the signaling device and the stimulus detectors, or if it is not possible to measure the bearing multiple times and obtain the precise user-location using a method such as triangulation. This method can be employed with any of the signaling modes discussed here, and potentially other signaling modes.

The methods that we have described for determining the precise goal may be used independently or in combination (where a final position determination is computed by averaging or otherwise combining the position estimates derived by each method individually).

It is also possible that while the rider is broadcasting a location indication signal, the rider also moves. Therefore, an autonomous vehicle that is receiving this signal and processing it to compute a precise location for the user (or her signaling device) and a precise goal location for picking up that user, might receive a series of location indication signals, and therefore update the precise goal location with time. Having a sequence of estimates of the precise location of the user is also useful in correcting for outliers and other errors that may be inherent in the estimation process using well-known methods such as Kalman filtering, or hidden Markov models, and other such methods—and therefore improving the quality of the precise goal location that is selected.

Having used one of the above methods for determining the precise goal location, the AV system determines and attempts to autonomously navigate to and come to a stop at a stopping place that is feasible and acceptable and is otherwise as near to the precise goal location as is possible, so that the rider can enter the vehicle. U.S. patent application Ser. No. 15/299,028, filed on Oct. 20, 2016, and incorporated in its entirety here by reference, describes the notion of feasibility and acceptability as it applies to stopping places, methods for an autonomous vehicle to find a feasible and acceptable stopping place (termed a "currently selected stopping place") near a goal location, and methods for an autonomous vehicle to navigate to and come to a stop at such a target stopping place. The term "target stopping place" used in this application is equivalent to the term "currently selected stopping place" used in the above referenced application.

The stopping place that is currently selected by the AV may be updated multiple times before the AV comes to a stop at a target stopping place. The reasons for this are described in U.S. patent application Ser. No. 15/299,028, filed on Oct. 20, 2016, and incorporated in its entirety here by reference. Furthermore, if the precise goal location is updated because new location indication signals are received and processed by the AV system, the AV system might also update the choice of target stopping place. This process may continue to take place until the autonomous vehicle stops at a target stopping place.

Direct Wireless Communication

In some implementations, a precise goal location need not be determined or inferred solely by the autonomous vehicle. The precise goal location (e.g., the precise location of the signaling device) may be determinable by the signaling device independently (i.e., without the device broadcasting a location indication signal to the autonomous vehicle by one or more of the signaling modes described earlier). In some instances, the precise goal location can be determined by a cooperation of the signaling device and the autonomous vehicle.

In some instances, the signaling device may transmit its knowledge of its precise location (or of knowledge useful in a cooperative determination of its precise location) to the autonomous vehicle by wireless communication of data that carries the knowledge, e.g., using the internet/cellular network and wireless transmitters and receivers located on the signaling device and the autonomous vehicle respectively. This communication may or may not happen through a central server.

Below are some examples of techniques by which the signaling device may be able to independently determine its location:

1. The well-known GPS (Global Positioning Technology) is one example of such technology. Most consumer smartphones come in-built with a GPS unit. But the position estimate obtained by most consumer-grade GPS units may be too imprecise to be of value for the use cases described in this application. GPS units with higher levels of precision do exist, but these are often expensive and restricted to military and scientific applications. However, the GPS information could be useful in a cooperative determination with the autonomous vehicle or the AV system of the precise location.

2. If the signaling device included a camera (which is normally the case with smartphones), or other visual sensor such as LIDAR—this sensor may be used to determine the location of the device by using the sensor to collect examples of the device's current surrounding and comparing this to prior knowledge. For example, if the signaling device were a smartphone with a rear-facing camera, the user could be instructed to turn on the camera, and rotate a full 360 degrees without moving from her spot, while holding the camera steady at shoulder-height. This is similar to the method that many users follow to take panoramic photographs from their smartphones. This method captures information on the user's current surroundings in the form of a panoramic photograph or a video that captures vertical features of the world. This can be compared to prior information, for example in the form of a 3D model of the world, such as is found in Google Earth. Well known computer vision techniques can be applied to extract features from the captured information that can be compared to features extracted from the prior information—which allows for the estimation of the precise location where the information was captured, i.e. the precise location of the signaling device.

3. Although we have described various methods for signaling to an autonomous vehicle by sending a location indication signal from (or on behalf of) a rider from a signaling device, similar techniques can be employed in reverse, i.e. for the purpose of sending a signal from a signaling device located on an autonomous vehicle to stimulus detectors located on the user's device (e.g., smartphone). Here, the previously described visual, light-based, auditory, and gesture-based emission of position signals would be performed by signal emitters on the vehicle and detection would be performed by stimulus detectors present on the rider's smartphone or other device. Methods for passive signaling using biometrics-based identification of the rider could not be employed in this configuration, however a conceptually similar method for passive signaling using identification of vehicle appearance could be employed (e.g., a vision sensor located on the signaling device could recognize features associated with the make, model, class, type, and/or potentially other distinguishing features, such as mechanisms or decals, placed on the autonomous vehicle solely for the purpose of enabling unique identification of the vehicle). This configuration assumes that relevant signal detection and emission equipment are present on the rider's smartphone and on the vehicle respectively.

Once a location signal is detected by the rider's smartphone or other device, the precise location of the vehicle with respect to the user device (or vice versa) may be calculated. Given knowledge of the precise location of the vehicle that is available to the AV system, the precise location of the user device may be inferred. This computation may take place on the user's smartphone, or the autonomous vehicle, or the central server, or on some combination of two or more of these entities.

We also note that this location signal does not need to originate from the rider's assigned vehicle only. Any entity that is aware of its precise location in space, or whose precise location is known to some central server (for example, based on a precise geodetic survey or other location determination techniques such as LIDAR localization), and which is equipped with the necessary signal emitters, may continuously or repeatedly broadcast a location signal that complies with some specified signaling protocol. Any device that is within range of that signal and equipped with the necessary stimulus detectors and subscribes to that same signaling protocol, can then interpret the location signal, and the precise location of that device may be calculated. Examples of such entities may include other vehicles, other autonomous vehicles, sensors embedded into infrastructure, etc.

Communication Between an Autonomous Vehicle and a Signaling Device

We have described various methods for location signaling to an autonomous vehicle by sending a location indication signal from (or on behalf of) a rider from a signaling device, that is, one-way communication from the rider to the autonomous vehicle. In some cases it may be desirable to enable two-way communication between the rider (or an associated signaling device) and the autonomous vehicle, for the purpose of confirming that the autonomous vehicle has received information from the signaling device, computed information related to the rider's precise location, is traveling to the rider's precise goal location, has come to a stop near the rider's precise goal location, or any combination of two or more of these or other reasons. The vehicle then signals the rider as it approaches.

In some implementations, one or both of these two directions of communication (between the rider and the vehicle), may be absent. For example, the user may specify a general goal location as part of the booking request, the assigned vehicle may come to a stop at a stopping place in the vicinity of this general goal location, and the user may find and board the assigned vehicle without any location signaling involved.

Figure 10:
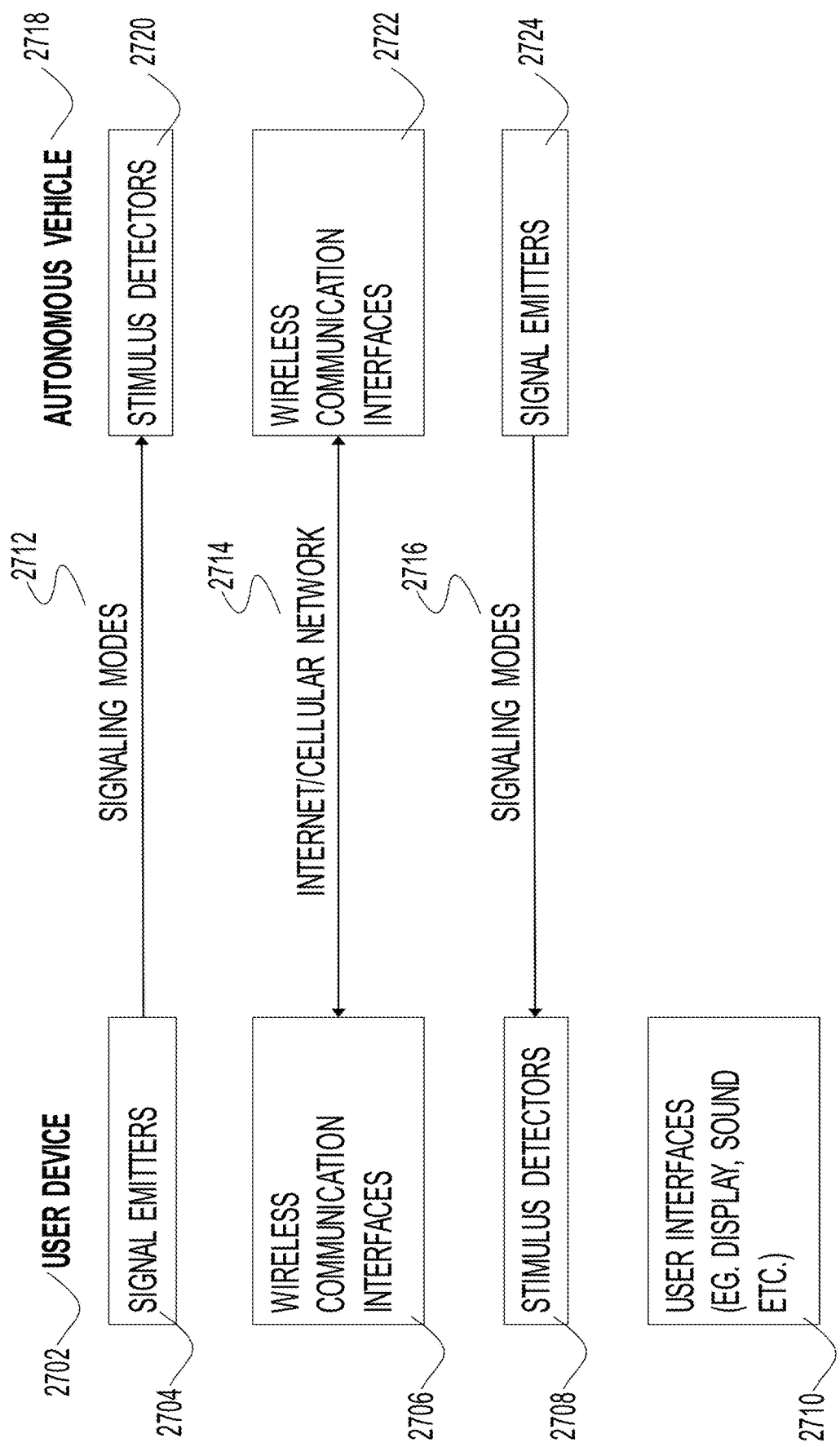

As shown in FIG. 10, the user's signaling device 2702 is equipped with signal emitters that emit location indication signals using signaling modes 2712 that are received by stimulus detectors 2720 on the autonomous vehicle 2718. In addition, the user device and the autonomous vehicle have a two-way communication link through the internet or the cellular network. In addition to these communication interfaces, signal emitters 2724 on the autonomous vehicle may emit signals using signaling modes 2716 that are received by stimulus detectors 2708 located on the user device. The signaling modes 2716 may differ from the signaling modes 2712 depending on the configuration of signal emitters and stimulus detectors on the user device and the autonomous vehicle. Similarly, these two communication links may use different signaling protocols.

For example, to confirm that the autonomous vehicle has received the location indication signal from the signaling device, upon detection of, for example, an image-based, light-based, auditory, gestural, or other location indication signal from a rider, the autonomous vehicle may transmit an image-based, light-based, or auditory receipt confirmation signal or a combination of them, for example, with the intent that this receipt confirmation would be uniquely identifiable as a response signal by a sensor or sensors of the rider's signaling device. The autonomous vehicle may also transmit a receipt confirmation signal through the cellular telephone network or Internet. Upon receipt of this receipt confirmation by the rider's signaling device, the rider's signaling device may indicate through a user interface 2710 (e.g., using an auditory notification or visual notification on a display screen or a combination of them) to the rider that the autonomous vehicle has identified the precise location of the rider and is adjusting its path in order to facilitate pick-up at the target stopping place.

Exemplary signaling modes for sending a receipt confirmation include those already described for sending a location indication signal. More specifically, such methods include but are not limited to one or a combination of two or more of the following:

1. Responding to a location indication signal by display of a black-and-white, grayscale, or color image or sequence of images on a display screen mounted on (for example on the outside of) the autonomous vehicle. The image properties (e.g., geometric features, texture, and appearance) should be chosen such that they can reliably be resolved by a vision sensor or sensors associated with the rider's signaling device and having a typical field of view and resolution, or directly perceived by a rider, given typical human vision characteristics. The display may also include, or exclusively comprise, text that may be directly read by the user or deciphered by the vision sensors on the rider's device using optical character recognition or other methods of reading text.

2. Responding to a location indication signal by emitting light from one or more display screen, light emitting device, light-emitting diode, or other signaling device mounted on (for example, on the exterior of) the autonomous vehicle. The light intensity should be chosen such that it can reliably be detected by a vision sensor or sensors or light detection sensor or auditory sensors associated with the rider's signaling device and having a typical detection sensitivity, or directly perceived by a rider.

3. Responding to a location signal by emitting from one or more speakers mounted on (for example, on the exterior of) the vehicle a sound or sequence of sounds. The volume level should be chosen such that it can reliably be detected by a sound measurement and sensor or sensors mounted on the rider's signaling device and having a typical detection sensitivity, or perceived by a rider, given a typical expected ambient noise level. Communication may also be verbal through speech output (utterances) by one or more speakers mounted on the exterior of the vehicle and verbal responses (utterances) received from the rider through one or more microphones mounted on the autonomous vehicle. In order to do so, a processor on the autonomous vehicle may execute a speech synthesis program or dialog system contained on the vehicle, play back recorded speech, or broadcast speech received from a human remote operator connected to the vehicle via a wireless link. The volume may be chosen to be appropriate for the distance of the rider to the autonomous vehicle. Once a verbal response has been received by the autonomous vehicle, a speech recognizer or decoding program on the vehicle may determine whether to interpret the received voice signal as a confirmation of the position signal.

4. Responding to a location signal by engaging one or more actuators located on the autonomous vehicle to move objects or mechanisms located on the vehicle, to create movements (in effect, gestures made by the vehicle) that may be reliably resolved by a vision sensor or sensors associated with the rider's signaling device and having a typical field of view and resolution, or directly perceived by a rider, given typical human vision characteristics. The rider or the target sensors associated with the rider's device may be provided knowledge of these mechanical gestures. For example, if the rider used a smartphone-based hailing app to hail the AV, the app could include an animated picture or video of the vehicle which shows the movements being created by the actuators on the vehicle. This way the rider is aware of the movements that the vehicle is performing and may actively look out for them.

5. Responding to a location signal by wireless communication with the rider's signaling device. This could use a direct peer-to-peer connection established between the vehicle and the rider's signaling device, communication through a central server which is connected to both the vehicle and the rider's signaling device through the Internet, or communication over a cellular network.

The image or images displayed, light or lights displayed, and sound or sounds emitted by the autonomous vehicle may exhibit properties that include, for example, those described above for image or images displayed, light or lights displayed, and sound or sounds emitted by the signaling device. Information may also be encoded in the image or images displayed, light or lights displayed, and sound or sounds emitted by the autonomous vehicle using, for example, the methods described above for the image or images displayed, light or lights displayed, and sound or sounds emitted by the signaling device.

As shown in FIG. 17, in some examples of the location signaling system described here, the autonomous vehicle first detects the location indication signal and decodes the information embedded in it to determine the precise goal location for the rider's pick-up. The autonomous vehicle may then send a response to the signaling device to indicate receipt of the location indication signal. The signaling device may forward the response to the user by giving the user notice on a mobile device using sounds or visual indicators. The autonomous vehicle then adjusts its goal location and navigates to a stopping place near the rider. In some implementations, not all of the steps shown in FIG. 17 need be performed.

The user is usually kept informed of the AV's current choice of a stopping place and its progress in reaching that place, so that the user may be ready to board the vehicle. As mentioned previously the target stopping place may change with time as the AV receives new information.

The progress of the vehicle may be reported in a number of ways. For example, information on the precise location of the AV (which is known to the AV) may be transmitted to the user's device and displayed on a user interface such as a map, potentially in conjunction with an estimate of the user's location (this estimate may be precise or not). Another example is to stream real-time pictures or videos taken from, for instance, a front-facing camera mounted on the AV and displaying these to the user through a user interface on, for instance, the user's smartphone hailing app. These images or videos may further be annotated to make it easier for the user to locate the vehicle using that information.

FIGS. 4-9 illustrate example user interface screens that may be implemented on a mobile device such as a tablet or a smartphone. A wide variety of other screens and features of screens can be used. The visual elements of the screens can be associated with sounds and haptic feedback to the user of the device as part of the user interface.

Figure 9:
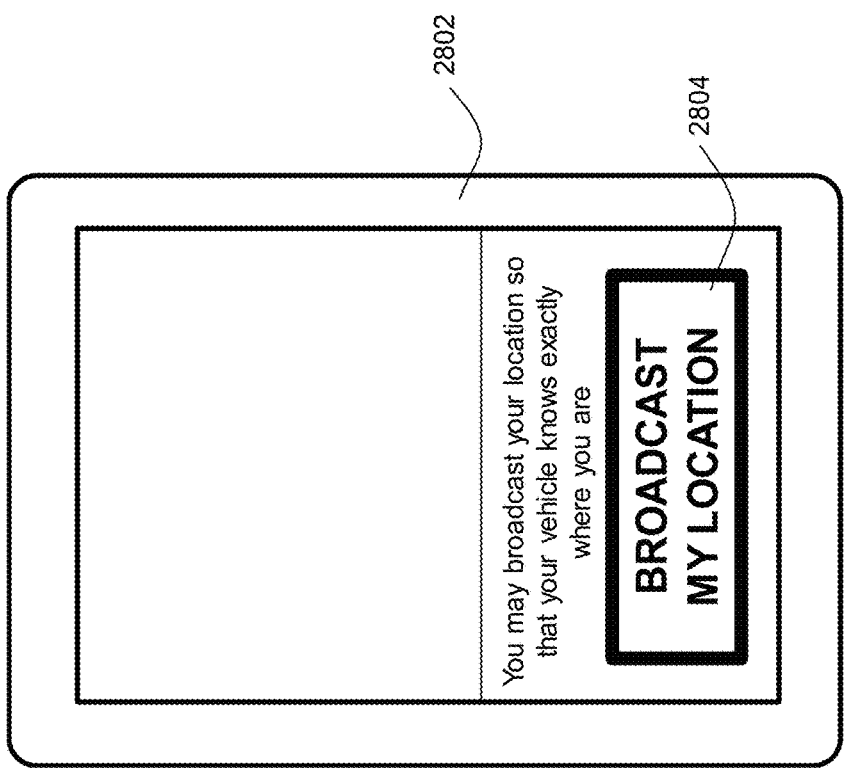

FIG. 9 shows a user interface that is based on a touch-screen 2802. In a typical use case, the user would have used a hailing app (such as Uber, Lyft, Grab and many others) to book a vehicle and may track the progress of the vehicle using the hailing app. In the interface described here, the user is given the option of broadcasting her location (i.e. to send out a location indication signal) by pressing a button 2804. This option may be presented in several ways, and it is also possible that the signal is broadcast without explicitly asking the user.

Figure 7:
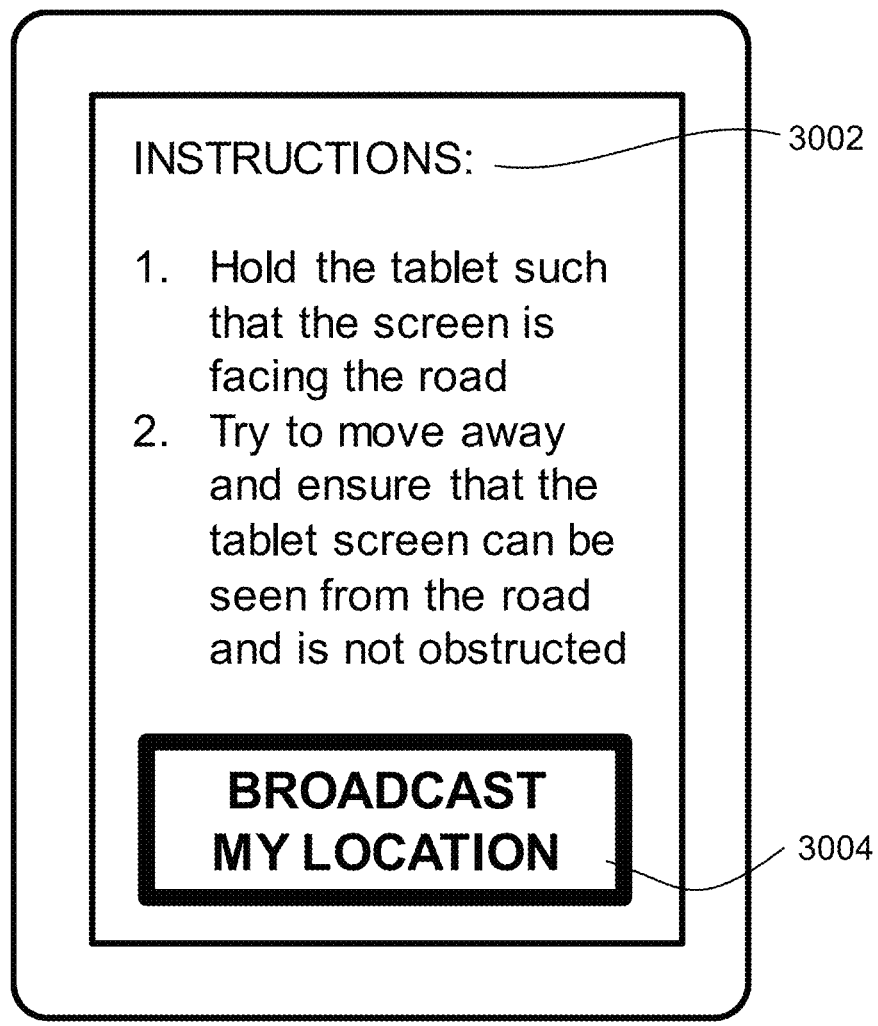
Figure 8:
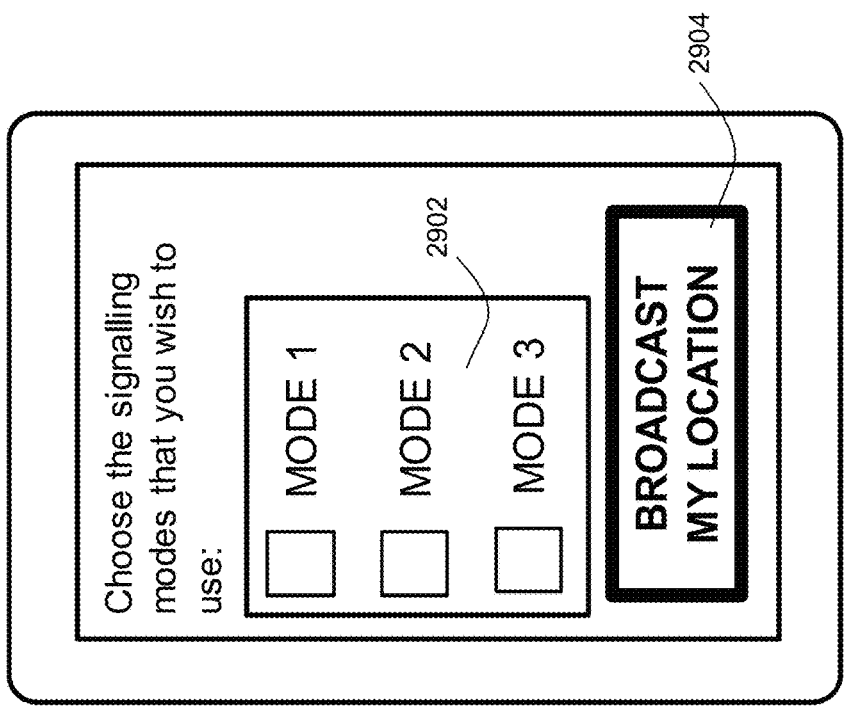

The user is then presented with a choice of signaling modes 2902 as shown in FIG. 8, from which the user may pick one or more signaling mode. In some implementations, this choice may be made by the system automatically without explicitly asking the user. The user is then presented with instructions 3002, as shown in FIG. 7, that relate to the signaling process. For example, in the case of a light or an image based signal that is emitted by the device display, it may be important to orient the display towards the road so that the signal travels in the direction from which the vehicle is likely to approach. The user may also be instructed to remain still and hold the display at or above shoulder level. As another example, if the signaling was to happen using gestures that are to be performed by the user, the instructions screen might display these gestures to the user using pictures or videos. The user may then be required to confirm by pressing a button 3004 before the location indication signal is emitted.

Figure 5:
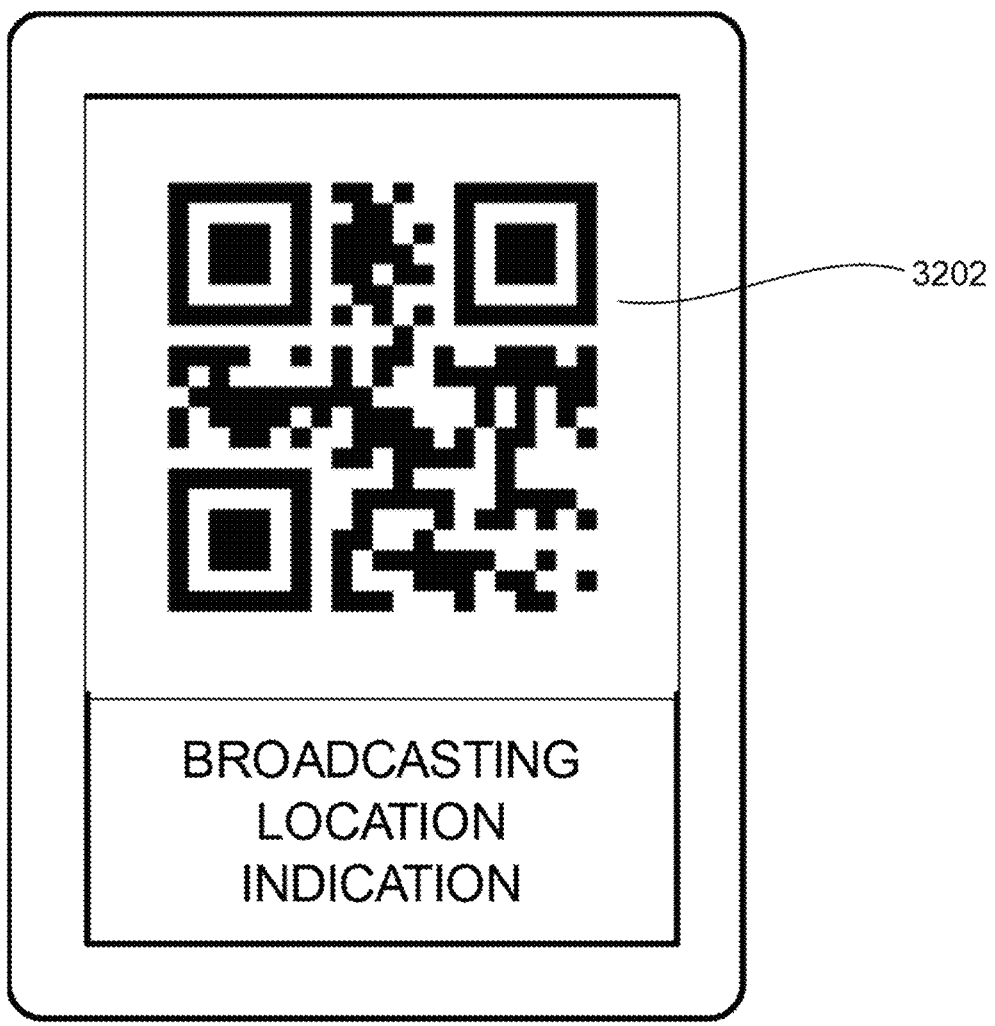
Figure 6:
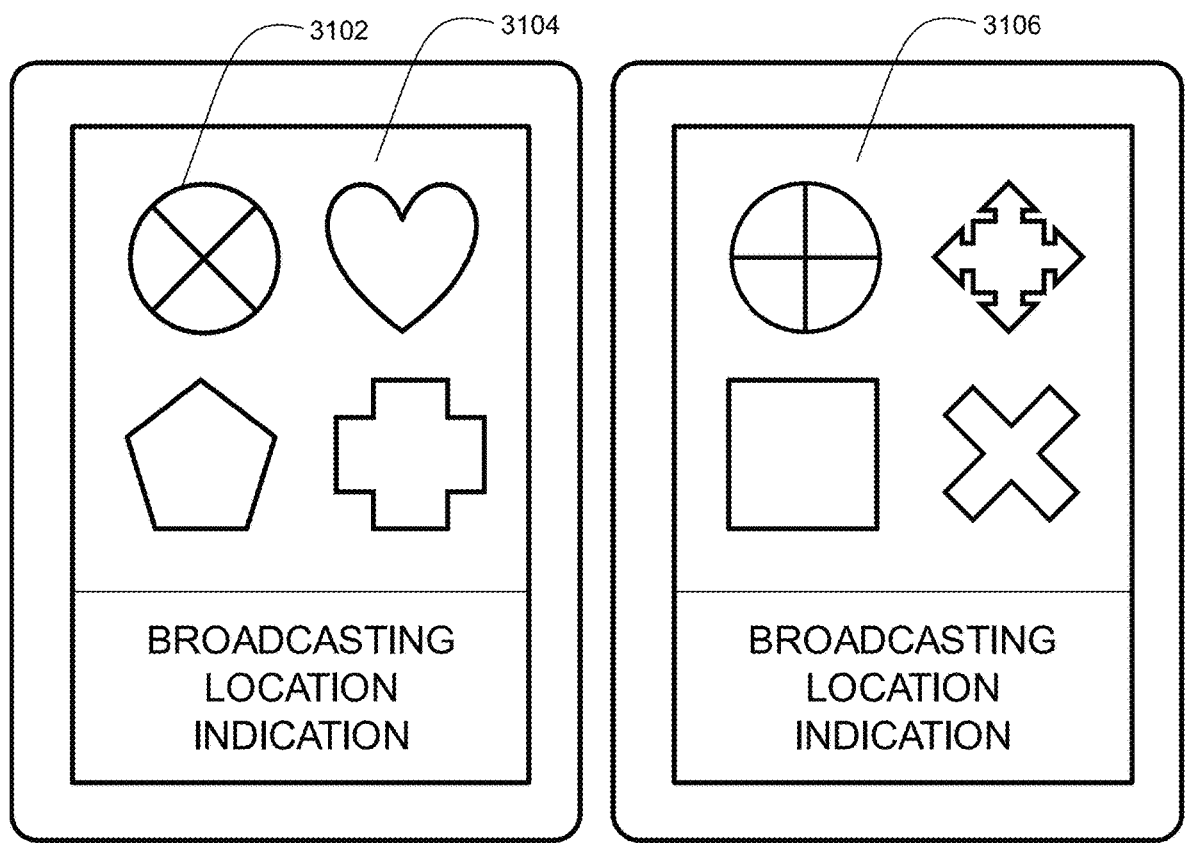

As shown in FIG. 6, signaling may be achieved by displaying a particular image or sequence of images 3104, 3106 (for example, displayed alternating at a fixed repeat rate). The image may be constructed of patterns 3102, or other distinctive visual features. The images may be black and white, grayscale, or use some other defined color palette. The texture might include information that is encoded in a format (such as QR codes 3202 as shown in FIG. 5, which encode information in a binary format).

Figure 2:
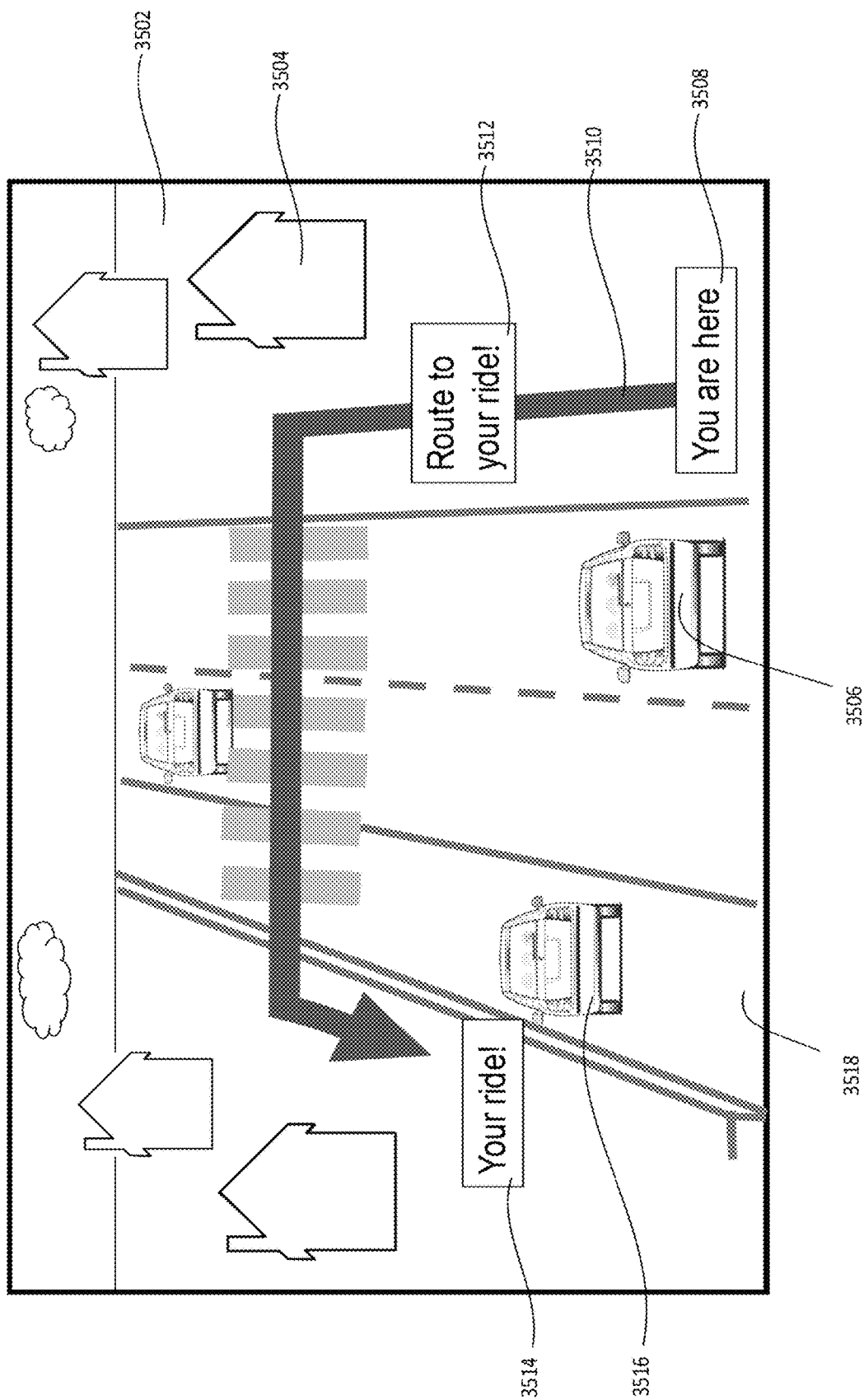
FIGS. 2, 4, 5, 6, 7, 8 and 9 are display screen shots.

FIG. 2 illustrates an example user interface that may be implemented on a mobile device such as a tablet or a smartphone, or on a virtual reality headset (such as Google Glass or many others). A wide variety of other screens and features of screens can be used. The visual elements of the screens can be associated with sounds and haptic feedback to the user of the device as part of the user interface. The figure shows an example of an augmented reality display where the display or headset shows the user a first person view of the world 3502 in front of the user, which captures elements such as buildings 3504, roads 3518, vehicles 3506, and other elements in the environment. This view may be augmented by marking the user's current location 3508, the path 3510 from the user's current location to, say, the target stopping place of the assigned vehicle. The path may be labeled using a textual label 3512 or some other graphical element. If the assigned vehicle 3516 is within the field of view, it may be highlighted specifically, for example using a textual label 3514 or other graphical element. In the case of a tablet or a smartphone, the user may be instructed to hold the display at eye level, and a camera located behind the display may be used to record a video of the world in front of the user. The processing capabilities of the device may be used to augment this video with elements such as the ones described above, before displaying the augmented video on the device's display. In the case of a virtual reality headset, the headset may contain a front-facing camera and processing capabilities to achieve a similar effect.

Figure 4:
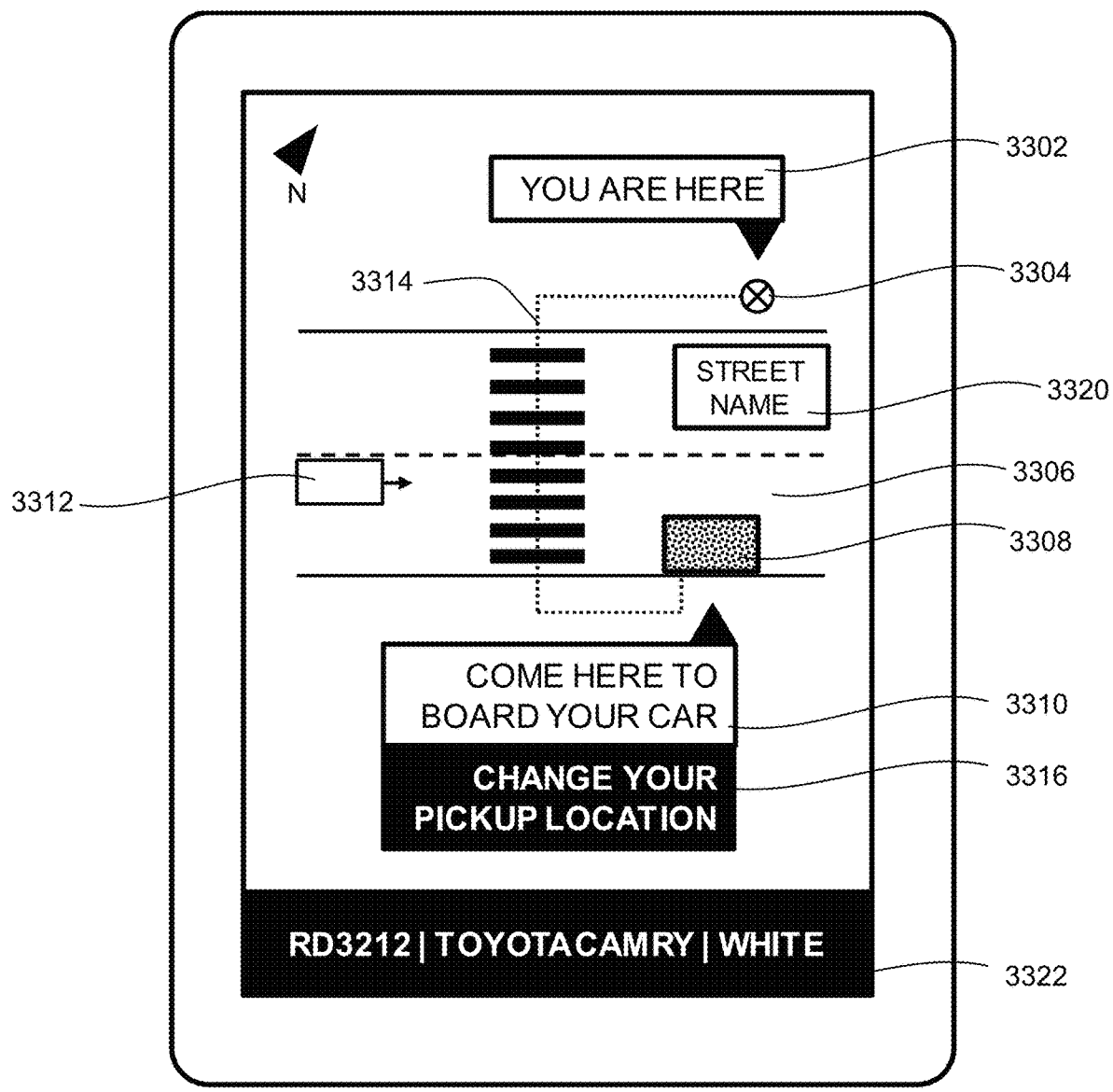

Once the location indication signal has been received and processed by the AV system, and an appropriate precise goal location and stopping place have been determined, this information can be communicated back to the user, using an interface such as the one shown in FIG. 4. The display shows a map 3306, that is focused on the area (streets may be marked with labels such as 3302) immediately around the precise location of the rider 3304 and target stopping place 3308.

These are marked by textual cues 3302 and 3310 so that the user clearly understands that one represents her current location and the other represents the stopping place where the vehicle will come and stop to pick her up. A walking route 3314 from the precise location of the user to the stopping place is also shown. The map may also show the precise vehicle location 3312, though the vehicle may not be visible to the user if it is not close to the user. The interface may also show details 3322 of the assigned vehicle, such as the vehicle registration number, model and make, color and other relevant details. The map interface may support standard navigational techniques such as panning and zooming in and out. Finally, the user is also provided an option of changing the stopping place by pressing a button 3316. This would allow the user to choose from a list of stopping places (that has been curated by the AV system) as described in U.S. patent application Ser. No. 15/299,028, filed on Oct. 20, 2016, and incorporated in its entirety here by reference (see FIG. 13 in the referenced patent application).

Because the target stopping place may change multiple times before the vehicle comes to a stop at a target stopping place, it may be desirable to avoid showing the user the target stopping place, until the vehicle has actually stopped in it, or is fairly confident that it will be able to stop in it (for example, when the vehicle is very close to the target stopping place and has verified with its own sensors that it is available.)

Communication without Line-of-Sight Using Sensors Located in Infrastructure or in Other Vehicles The signaling modes described thus far involve direct communication between the signaling device and the stimulus detectors located on the assigned vehicle or the rider's device or both. Therefore, for these modes to function, the assigned vehicle's stimulus detectors must be within a certain range of the signaling device, and for visual stimuli, no physical obstructions may be present between the signaling device and the stimulus detector.

It is possible that the location indication signals being broadcast by a signaling device are received by a vehicle other than the assigned vehicle because that vehicle is within range of the signaling device. This may happen because the vehicle is scanning for and able to receive signals other than from its assigned passenger's signaling device. The central server may also deliberately instruct all vehicles in its fleet that are within a certain distance of the rider's general location to scan for and detect location indication signals from the rider's signaling device. The purpose of such a strategy is to increase the likelihood of detecting the rider's location indication signal or detecting the location indication signal sooner. The vehicle that detected the location signal may then compute the precise location of the rider, or a precise goal location for the pick-up, using the methods described previously, and transmit this information to the rider's assigned vehicle using the cellular network or the Internet.

To increase the effective range of the signaling device, stimulus detectors equipped with computing devices and with access to map data may be embedded in infrastructure. Examples of such infrastructure include streetlamps, public telephones or kiosks, CCTV cameras, pavements, curbs etc. These may include stimulus detectors similar to those described previously and they may receive location indication signals from the rider's signaling device. The computation of the precise location of the rider or the precise goal location may take place on these devices, or the information from the signal may be relayed to a central server or an autonomous vehicle or the user device or other location where the computation takes place using the cellular network or the Internet, or the computation may take place cooperatively between one or more of such entities. This information may then be relayed to the assigned vehicle via the cellular network or the Internet.

Teleoperator-Assisted Location Determination

Determination of the precise location of a user or a precise goal location may also be performed by a remote operator, also known as a tele-operator, who may be presented with the signals received by the stimulus detectors, in a raw or a processed form, in addition to other data. This may happen, for example, when the location determination process is unable to estimate the precise location of the user with sufficient precision, or a tele-operator may be used to process all location indication signals.

For example, in the case of signaling modes such as an image based display, or gestures, or passive biometric recognition of the rider's face, where the stimulus detector is a camera (or multiple cameras) located on the autonomous vehicle, the video stream from these cameras may be transmitted to the tele-operator. These video streams may be presented to the tele-operator on a user interface, such as a touchscreen monitor or other display device. The video streams may be presented to the tele-operator as-is, or they may be augmented, for example using the processes and algorithms discussed previously in this application, to aid the tele-operator by attempting to determine the precise location of the user and providing that to the tele-operator as a suggestion. The video streams may also be augmented by overlaying data from other sensors over the video, for example a point-cloud from a LIDAR sensor. The user interface may also permit the tele-operator to identify the rider, or the precise location of the rider, or a precise goal location for the autonomous vehicle by providing a touch-based interface to the tele-operator, for example, by clicking on a touchscreen.

Other implementations are within the scope of the following claims.

The invention claimed is:

1. A method comprising:
receiving, by an autonomous vehicle system, a request for use of an autonomous vehicle from a user, the request including in indication of a general goal location, the general goal location having a first degree of precision and a first degree of accuracy regarding a location of the user;
instructing, by the autonomous vehicle system, the autonomous vehicle to proceed from an initial location towards the general goal location;
while the autonomous vehicle is proceeding from the initial location towards the general goal location, determining, by the autonomous vehicle system, a precise goal location, the precise goal location being within a vicinity of a general goal location, the precise location having a second degree of precision and a second degree of accuracy regarding the location of the user, wherein at least one of:
the second degree of precision is greater than the first degree of precision, or
the second degree of accuracy is greater than the first degree of accuracy, and
wherein the precise goal location is determined based on a wireless communication between the autonomous vehicle and the user when the autonomous vehicle and the user are within line-of-sight;
determining, by the autonomous vehicle system, a stopping place at which the autonomous vehicle and a user will engage in a destination goal location activity, the stopping place being within a vicinity of the precise goal location; and
instructing, by the autonomous vehicle system, the autonomous vehicle to proceed towards and stop at the stopping place.

2. The method of claim 1, wherein the precise goal location is the actual precise location of the user.

3. The method of claim 1, wherein the precise goal location is determined based on a distance from the autonomous vehicle to one of the precise goal location and the general goal location.

4. The method of claim 3, wherein the distance is determined comprising determining the distance repeatedly.

5. The method of claim 1, wherein the precise goal location is determined based on road data.

6. The method of claim 1, wherein the precise goal location changes over time.

7. The method of claim 1, further comprising:
transmitting, by the autonomous vehicle system to a mobile device associated with the user, a command to generate an image or series of images using a display of the mobile device, and
wherein determining the precise goal location comprises:
obtaining, by the autonomous vehicle system, sensor data comprising visual information regarding an environment of the autonomous vehicle,
identifying, by the autonomous vehicle system based on the sensor data, the image or the series of images in the environment of the autonomous vehicle, and
determining the precise goal location based on the identification of the image or the series of images in the environment of the autonomous vehicle.

8. The method of claim 1, further comprising:
transmitting, by the autonomous vehicle system to a mobile device associated with the user, a command to generate a sound using a speaker of the mobile device, and
wherein determining the precise goal location comprises:
obtaining, by the autonomous vehicle system, sensor data comprising auditory information regarding an environment of the autonomous vehicle,
identifying, by the autonomous vehicle system based on the sensor data, the sound in the environment of the autonomous vehicle, and
determining the precise goal location based on the identification of the sound in the environment of the autonomous vehicle.

9. The method of claim 1, wherein determining the precise goal location comprises:
obtaining, by the autonomous vehicle system, sensor data comprising visual information regarding an environment of the autonomous vehicle,
identifying, by the autonomous vehicle system based on the sensor data, the user performing a pre-determined gesture in in the environment of the autonomous vehicle, and
determining the precise goal location based on the identification of the user performing the pre-determined gesture in the environment of the autonomous vehicle.

10. The method of claim 1, further comprising:
transmitting, by the autonomous vehicle system to a mobile device associated with the user, a command to generate a modulated sequence of light using the mobile device, and
wherein determining the precise goal location comprises:
obtaining, by the autonomous vehicle system, sensor data comprising visual information regarding an environment of the autonomous vehicle,
identifying, by the autonomous vehicle system based on the sensor data, the modulated sequence of light in the environment of the autonomous vehicle, and
determining the precise goal location based on the identification of the modulated sequence of light in the environment of the autonomous vehicle.

11. The method of claim 1, wherein determining the precise goal location comprises:
determining, based on the wireless communication, a bearing of a user relative to the autonomous vehicle;
responsive to determining the bearing of a user relative to the autonomous vehicle, instructing the autonomous vehicle to direct a directional sensor towards the determined bearing; and
determining a distance between the user and the autonomous vehicle based on sensor data obtained from the directional sensor.

* * * * *

UNITED STATES PATENT AND TRADEMARK OFFICE
CERTIFICATE OF CORRECTION

PATENT NO. : 10,740,863 B2
APPLICATION NO. : 15/401499
DATED : August 11, 2020
INVENTOR(S) : Karl Iagnemma and Harshavardhan Ravichandran Page 1 of 1

It is certified that error appears in the above-identified patent and that said Letters Patent is hereby corrected as shown below:

In the Claims

Column 25, Line 49, in Claim 4, after "determined" delete "comprising determining";

Column 26, Line 30, in Claim 9, delete "in in" and insert -- in --.

Signed and Sealed this
Thirteenth Day of October, 2020

Andrei Iancu
*Director of the United States Patent and Trademark Office*